United States Patent
Seregin

(10) Patent No.: US 9,826,244 B2
(45) Date of Patent: Nov. 21, 2017

(54) DEVICE AND METHOD FOR SCALABLE CODING OF VIDEO INFORMATION BASED ON HIGH EFFICIENCY VIDEO CODING

(71) Applicant: QUALCOMM Incorporated, San Diego, CA (US)

(72) Inventor: Vadim Seregin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 590 days.

(21) Appl. No.: 14/137,510

(22) Filed: Dec. 20, 2013

(65) Prior Publication Data

US 2014/0192883 A1 Jul. 10, 2014

Related U.S. Application Data

(60) Provisional application No. 61/750,259, filed on Jan. 8, 2013, provisional application No. 61/751,784, filed (Continued)

(51) Int. Cl.
*H04N 19/00* (2014.01)
*H04N 19/33* (2014.01)
(Continued)

(52) U.S. Cl.
CPC ............. *H04N 19/33* (2014.11); *H04N 19/52* (2014.11); *H04N 19/96* (2014.11)

(58) Field of Classification Search
CPC .. H04N 7/12; H04N 13/0022; H04N 13/0221; H04N 13/0257; H04N 13/026;
(Continued)

(56) References Cited

U.S. PATENT DOCUMENTS 8,494,042 B2 * 7/2013 Park ................. H04N 19/00018
345/530
2011/0096832 A1 * 4/2011 Zhang .................. G06T 7/0071
375/240.08
(Continued)

FOREIGN PATENT DOCUMENTS

TW 201233184 A 8/2012
WO WO-2012122169 9/2012
WO WO-2012167711 A1 12/2012

OTHER PUBLICATIONS

HEVC High efficiency video coding (HEVC) text specification draft 6, Joint Collaborative Team on Video Coding (JCT-VC) of ITU-T SG16 WP3 and ISO/IEC JTC1/SC29/WG11 7th Meeting: Geneva, CH, Nov. 21-30, 2011.*

(Continued)

*Primary Examiner* — Frank Huang
(74) *Attorney, Agent, or Firm* — Knobbe, Martens, Olson & Bear, LLP

(57) ABSTRACT

An apparatus configured to code video information includes a memory unit and a processor in communication with the memory unit. The memory unit is configured to store a candidate list generated for coding the video information. The candidate list comprises at least one base layer motion vector candidate. The processor is configured to determine a behavior for generating said at least one base layer motion vector candidate, generate said at least one base layer motion vector candidate for a current prediction unit (PU) in a particular coding unit (CU) according to the determined behavior, wherein the particular CU has one or more PUs, and add said at least one base layer motion vector candidate to the candidate list. The processor may encode or decode the video information.

36 Claims, 10 Drawing Sheets

Related U.S. Application Data on Jan. 11, 2013, provisional application No. 61/754,559, filed on Jan. 19, 2013.

(51) Int. Cl.
*H04N 19/52* (2014.01)
*H04N 19/96* (2014.01)

(58) Field of Classification Search
CPC    H04N 7/32; H04N 7/26; H04N 19/52; H04N 19/70; H04N 19/895; H04N 19/51; H04N 19/61; H04N 19/46; H04N 21/44016; G06K 9/00; G06T 7/0071; G06T 2207/10016
See application file for complete search history.

(56) References Cited

U.S. PATENT DOCUMENTS

| | | | | |
|---|---|---|---|---|
| 2012/0195368 A1* | 8/2012 | Chien | ............... | H04N 19/52 375/240.02 |
| 2012/0230401 A1* | 9/2012 | Chen | ............... | H04N 21/44016 375/240.12 |
| 2012/0257678 A1* | 10/2012 | Zhou | ............... | H04N 19/436 375/240.16 |
| 2012/0263231 A1* | 10/2012 | Zhou | ............... | H04N 19/52 375/240.12 |
| 2013/0016776 A1* | 1/2013 | Boyce | ............... | H04N 19/30 375/240.06 |
| 2013/0016788 A1* | 1/2013 | Oh | ............... | H04N 19/107 375/240.16 |
| 2013/0034170 A1* | 2/2013 | Chen | ............... | H04N 13/00 375/240.25 |
| 2013/0114720 A1* | 5/2013 | Wang | ............... | H04N 19/00684 375/240.16 |

OTHER PUBLICATIONS

Taiwan Search Report—TW103100517—TIPO—Sep. 16, 2015.

Chen J., et al., "Description of scalable video coding technology proposal by Qualcomm (configuration 1)", 11. JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG.16); URL: http://wftp3.itu.int/av-arch/jctvc-site/, No. JCTVC-K0035, Oct. 2, 2012 (Oct. 2, 2012), pp. 1-19, XP030112967.

International Search Report and Written Opinion—PCT/US2013/077425—ISA/EPO—Jun. 8, 2015.

Kim, H.Y., et al., "Non-CE9: Throughput improvement for merge/skip mode", 8. JCT-VC Meeting; 99. MPEG Meeting; Jan. 2, 2012-Oct. 2, 2012; San Jose; (Joint Collaborative Team on Video Coding of ISO/IEC JTC1/SC29/WG11 and ITU-T SG.16 ); URL: http://wftp3.1tu.int/av-arch/jctvc-site/, No. JCTVC-H0240, Jan. 20, 2012 (Jan. 20, 2012), 5 pages; XP030111267.

Partial International Search Report—PCT/US2013/077425—ISA/EPO—Apr. 1, 2015.

Seregin V., et al., "Description of Tool Experiment C5: Inter-layer syntax prediction using Hevc base layer", 11. JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG.16); URL: http://wftp3.itu.int/av-arch/jctvc-site/, No. JCTVC-K1105, Nov. 3, 2012 (Nov. 3, 2012), pp. 1-14, XP030113279.

Kim H Y., et al., "Cu-based Merge Candidate List Construction," Document: JCTVC-G416, Joint Collaborative Team on Video Coding (JCT-VC) of ITU-T SG16 WP3 and ISO/IEC JTC1/SC29/WG11, 7th Meeting: Geneva, No. JCTVCG416, Nov. 8, 2011 (Nov. 8, 2011), XP030110400.

Lin J-L ., et al., "Non-CE9: CU-based Parallel Merge Mode," 8. JCT-VC Meeting; 99, MPEG Meeting; Jan. 2, 2012-Oct. 2, 2012; San Jose; (Joint Collaborative Team on Video Coding of ISO/IEC JTC1/SC29/WG11 and ITU-T SG.16 ); URL: http://wftp3.1tu.int/av-arch/jctvc-site/, No. JCTVC-H0278, Jan. 20, 2012 (Jan. 20, 2012), XP030111305, 4 pages.

Seregin V. et al., "Non-CE9: Single TMVP for merge mode", 8. JCT-VC Meeting; 99. MPEG Meeting; Jan. 2, 2012-Oct. 2, 2012; San. Jose; (Joint Collaborative Team on Video Coding of ISO/IEC JTC1/SC29/WG11 and ITU-T SG.16); URL: http://wftp3.itu.int/av-arch/jctvc-site/ No. JCTVC-H0430, Jan. 21, 2012, XP030111457.

\* cited by examiner

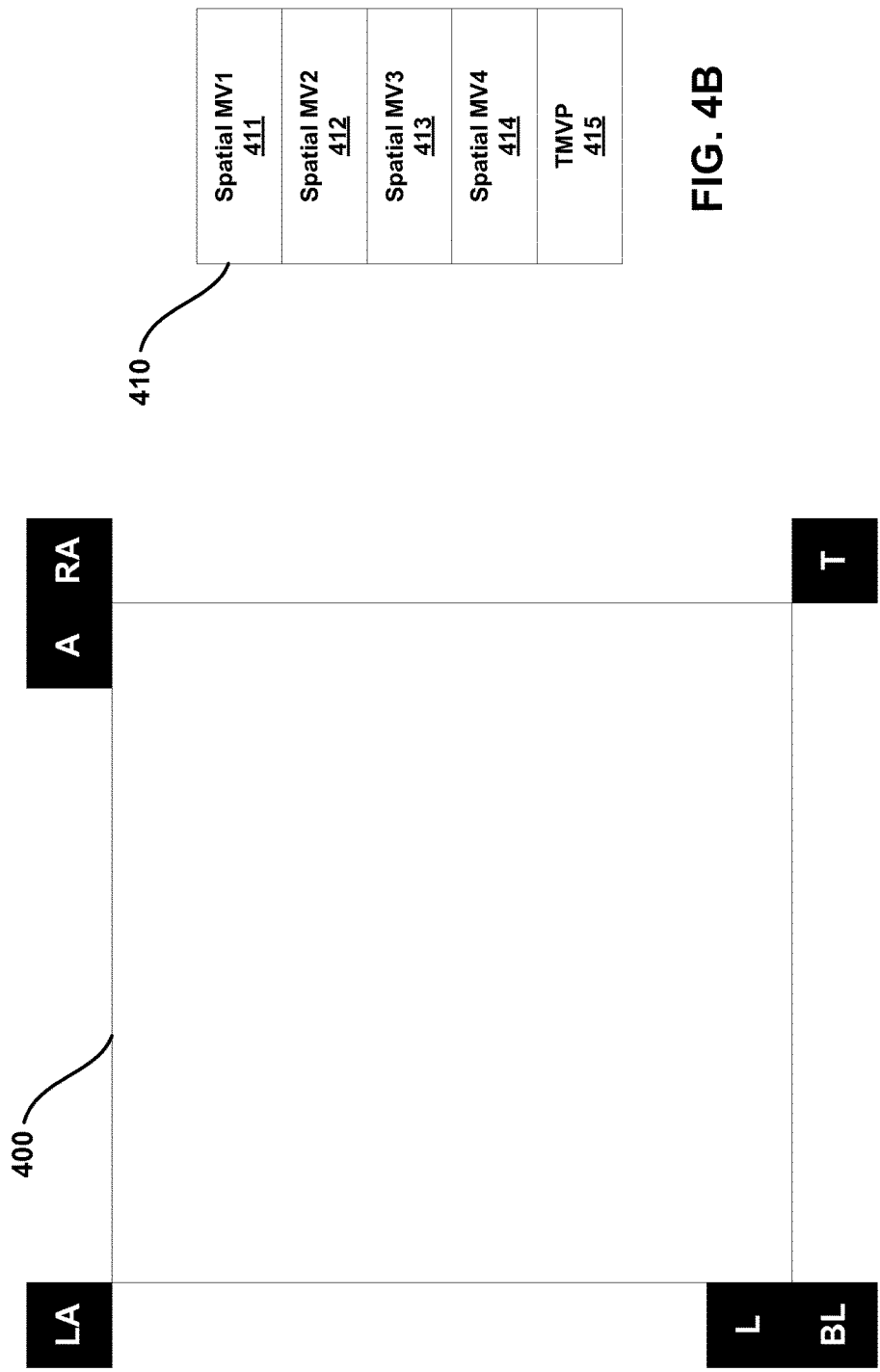

DEVICE AND METHOD FOR SCALABLE CODING OF VIDEO INFORMATION BASED ON HIGH EFFICIENCY VIDEO CODING

CROSS-REFERENCE TO RELATED APPLICATIONS

This application claims priority to U.S. Provisional No. 61/750,259, filed Jan. 8, 2013, U.S. Provisional No. 61/751,784, filed Jan. 11, 2013, and U.S. Provisional No. 61/754,559, filed Jan. 19, 2013, all of which are hereby incorporated by reference in their entireties.

TECHNICAL FIELD

This disclosure relates to the field of video coding and compression, scalable coding based on high efficiency video coding (HEVC), and multiview and 3DV coding based on HEVC.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video compression techniques perform spatial (intra-picture) prediction and/or temporal (inter-picture) prediction to reduce or remove redundancy inherent in video sequences. For block-based video coding, a video slice (e.g., a video frame, a portion of a video frame, etc.) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy encoding may be applied to achieve even more compression.

SUMMARY

Scalable video coding (SVC) refers to video coding in which a base layer (BL), sometimes referred to as a reference layer (RL), and one or more scalable enhancement layers (ELs) are used. For SVC, the base layer can carry video data with a base level of quality. The one or more enhancement layers can carry additional video data to support higher spatial, temporal, and/or signal-to-noise SNR levels. Enhancement layers may be defined relative to a previously encoded layer.

For example, a bottom layer may serve as a BL, while a top layer may serve as an EL. Middle layers may serve as either ELs or RLs, or both. For example, a layer in the middle may be an EL for the layers below it, such as the base layer or any intervening enhancement layers, and at the same time serve as a RL for one or more enhancement layers above it. Similarly, in the Multiview or 3D extension of the HEVC standard, there may be multiple views, and information of one view may be utilized to code (e.g., encode or decode) the information of another view (e.g., motion estimation, motion vector prediction and/or other redundancies).

In the HEVC extension, a current block in the enhancement layer or another view may be predicted using a corresponding block in the base layer or view. For example, the syntax elements, motion information (e.g., motion vectors) or mode information (e.g., intra mode) of the current block may be based on the corresponding block in the base layer. For example, a base layer motion vector (MV) may be used as a candidate in the enhancement layer merge/AMVP (advanced motion vector prediction) candidate lists. A candidate list is an array of spatial and temporal motion vector predictors to be utilized by the coder (e.g., encoder or decoder) to predict the current block. This list may include motion vectors of spatial neighbor blocks that are spatial neighbors of the current block and are within the same picture that includes the current block. The list may also include a motion vector from a temporally co-located block (which is referred to as a temporal motion vector predictor or TMVP). The temporally co-located block refers to a block in a picture other than the picture that includes the current block, and is located at the same position within said other picture as the position where the current block is located in its picture. In some examples, the list may also include a motion vector for co-located block in another layer or another view. For example, the block may be in a picture in an enhancement layer, and the co-located block from which the motion vector is derived may be in a picture in a base layer. As another example, the block may be in a picture in a dependent view, and the co-located block may be in a picture in a base view.

When spatial and temporal candidates are added to the candidate list, how such candidates are generated and added to the candidate list may differ. For example, in one embodiment, spatial candidates may be generated for every PU, and temporal candidates may be generated only once for the particular CU. However, for example, when base layer motion vectors (BL MVs) are added to the candidate list and single candidate list generation (e.g., dependency on neighboring PUs is eliminated for spatial candidates, and the spatial candidates are generated only once for all PUs in a CU or a group of CUs) is enabled with motion estimation region (MER) defined when parallel motion estimation (PME) is used, the method for treating such BL MVs needs to be defined. By defining how to treat such BL MVs when BL MVs are added to the candidate list, for example, for single candidate list generation, the techniques described in this disclosure may improve coding efficiency and/or reduce computational complexity associated with a method of coding video data.

The systems, methods and devices of this disclosure each have several innovative aspects, no single one of which is solely responsible for the desirable attributes disclosed herein.

In one embodiment, an apparatus configured to code video information includes a memory unit and a processor in communication with the memory unit. The memory unit is configured to store a motion vector candidate list or simply a candidate list generated for coding the video information. The candidate list comprises at least one base layer motion vector candidate. The processor is configured to determine a behavior for generating said at least one base layer motion vector candidate, generate said at least one base layer motion vector candidate for a current prediction unit (PU) in a particular coding unit (CU) according to the determined behavior, wherein the particular CU has one or more PUs, and add said at least one base layer motion vector candidate to the candidate list. The candidate list generation may be done in either merge mode or advanced motion vector prediction (AMVP) mode. For example, the encoder may select one of the modes for each PU and signal the mode in the bitstream with a flag. In some embodiments, the candidate list may further include a spatial candidate and a temporal motion vector predictor (TMVP). In one embodiment, the base layer (BL) motion vector (MV) candidate may be generated for each PU, the spatial candidate may be generated only once for the particular CU, and the TMVP may be derived for each PU. In another embodiment, the BL MV candidate may be generated only once for the particular CU, the spatial candidate may be generated only once for the particular CU, and the TMVP may be derived for each PU. In yet another embodiment, the BL MV candidate may be generated only once for the particular CU, the spatial candidate may be generated only once for the particular CU, and the TMVP may be derived only once for the particular CU. Pruning may be applied between the BL MV candidate (s) and the spatial candidate(s). Alternatively, pruning is prevented from being applied between the BL MV candidate (s) and the spatial candidate(s). The BL MV may be derived from any position inside or outside of the co-located block in a base layer. For example, it may be the center block or any corners, or the bottom right block outside of the co-located block.

In another embodiment, a method of encoding video information includes: storing a candidate list for encoding the video information; determining a behavior for generating said at least one base layer motion vector candidate; generating said at least one base layer motion vector candidate for a current prediction unit (PU) in a particular coding unit (CU) according to the determined behavior, the particular CU having one or more PUs; and adding said at least one base layer motion vector candidate to the candidate list. The candidate list generation may be done in either merge mode or advanced motion vector prediction (AMVP) mode. In some embodiments, the candidate list may further include a spatial candidate and a temporal motion vector predictor (TMVP). In one embodiment, the base layer (BL) motion vector (MV) candidate may be generated for each PU, the spatial candidate may be generated only once for the particular CU, and the TMVP may be derived for each PU. In another embodiment, the BL MV candidate may be generated only once for the particular CU, the spatial candidate may be generated only once for the particular CU, and the TMVP may be derived for each PU. In yet another embodiment, the BL MV candidate may be generated only once for the particular CU, the spatial candidate may be generated only once for the particular CU, and the TMVP may be derived only once for the particular CU. Pruning may be applied between the BL MV candidate(s) and the spatial candidate(s). Alternatively, pruning is prevented from being applied between the BL MV candidate(s) and the spatial candidate(s). The BL MV may be derived from any position inside or outside of the co-located block in a base layer. For example, it may be the center block or any corners, or the bottom right block outside of the co-located block.

In another embodiment, a method of decoding video information includes: receiving syntax elements extracted from an encoded video bitstream, wherein the syntax elements comprise video information associated with a candidate list comprising at least one base layer motion vector candidate; determining a behavior for generating said at least one base layer motion vector candidate; generating said at least one base layer motion vector candidate for a current prediction unit (PU) in a particular coding unit (CU) according to the determined behavior, the particular CU having one or more PUs; and adding said at least one base layer motion vector candidate to the candidate list. The candidate list generation may be done in either merge mode or advanced motion vector prediction (AMVP) mode. In some embodiments, the candidate list may further include a spatial candidate and a temporal motion vector predictor (TMVP). In one embodiment, the base layer (BL) motion vector (MV) candidate may be generated for each PU, the spatial candidate may be generated only once for the particular CU, and the TMVP may be derived for each PU. In another embodiment, the BL MV candidate may be generated only once for the particular CU, the spatial candidate may be generated only once for the particular CU, and the TMVP may be derived for each PU. In yet another embodiment, the BL MV candidate may be generated only once for the particular CU, the spatial candidate may be generated only once for the particular CU, and the TMVP may be derived only once for the particular CU. Pruning may be applied between the BL MV candidate(s) and the spatial candidate(s). Alternatively, pruning is prevented from being applied between the BL MV candidate(s) and the spatial candidate(s). The BL MV may be derived from any position inside or outside of the co-located block in a base layer. For example, it may be the center block or any corners, or the bottom right block outside of the co-located block.

In another embodiment, a non-transitory computer readable medium includes code that, when executed, causes an apparatus to: store a candidate list which comprises at least one base layer motion vector candidate; determine a behavior for generating said at least one base layer motion vector candidate; generate said at least one base layer motion vector candidate for a current prediction unit (PU) in a particular coding unit (CU) according to the determined behavior, the particular CU having one or more PUs; and add said at least one base layer motion vector candidate to the candidate list. In some embodiments, the candidate list may further include a spatial candidate and a temporal motion vector predictor (TMVP). In one embodiment, the base layer (BL) motion vector (MV) candidate may be generated for each PU, the spatial candidate may be generated only once for the particular CU, and the TMVP may be derived for each PU. In another embodiment, the BL MV candidate may be generated only once for the particular CU, the spatial candidate may be generated only once for the particular CU, and the TMVP may be derived for each PU. In yet another embodiment, the BL MV candidate may be generated only once for the particular CU, the spatial candidate may be generated only once for the particular CU, and the TMVP may be derived only once for the particular CU.

In another embodiment, a video coding device configured to code video information includes: means for storing a candidate list which comprises at least one base layer motion vector candidate; means for determining a behavior for generating said at least one base layer motion vector candidate; means for generating said at least one base layer motion vector candidate for a current prediction unit (PU) in a particular coding unit (CU) according to the determined behavior, the particular CU having one or more PUs; and means for adding said at least one base layer motion vector candidate to the candidate list. In some embodiments, the candidate list may further include a spatial candidate and a temporal motion vector predictor (TMVP). In one embodiment, the base layer (BL) motion vector (MV) candidate may be generated for each PU, the spatial candidate may be generated only once for the particular CU, and the TMVP may be derived for each PU. In another embodiment, the BL MV candidate may be generated only once for the particular CU, the spatial candidate may be generated only once for the particular CU, and the TMVP may be derived for each PU. In yet another embodiment, the BL MV candidate may be generated only once for the particular CU, the spatial candidate may be generated only once for the particular CU, and the TMVP may be derived only once for the particular CU.

BRIEF DESCRIPTION OF DRAWINGS

FIG. 4A is a block diagram illustrating an example of a sub-block that is to be predicted.

FIG. 4B is a conceptual diagram illustrating a list of candidate motion vectors for the sub-block.

DETAILED DESCRIPTION

Figure 1:
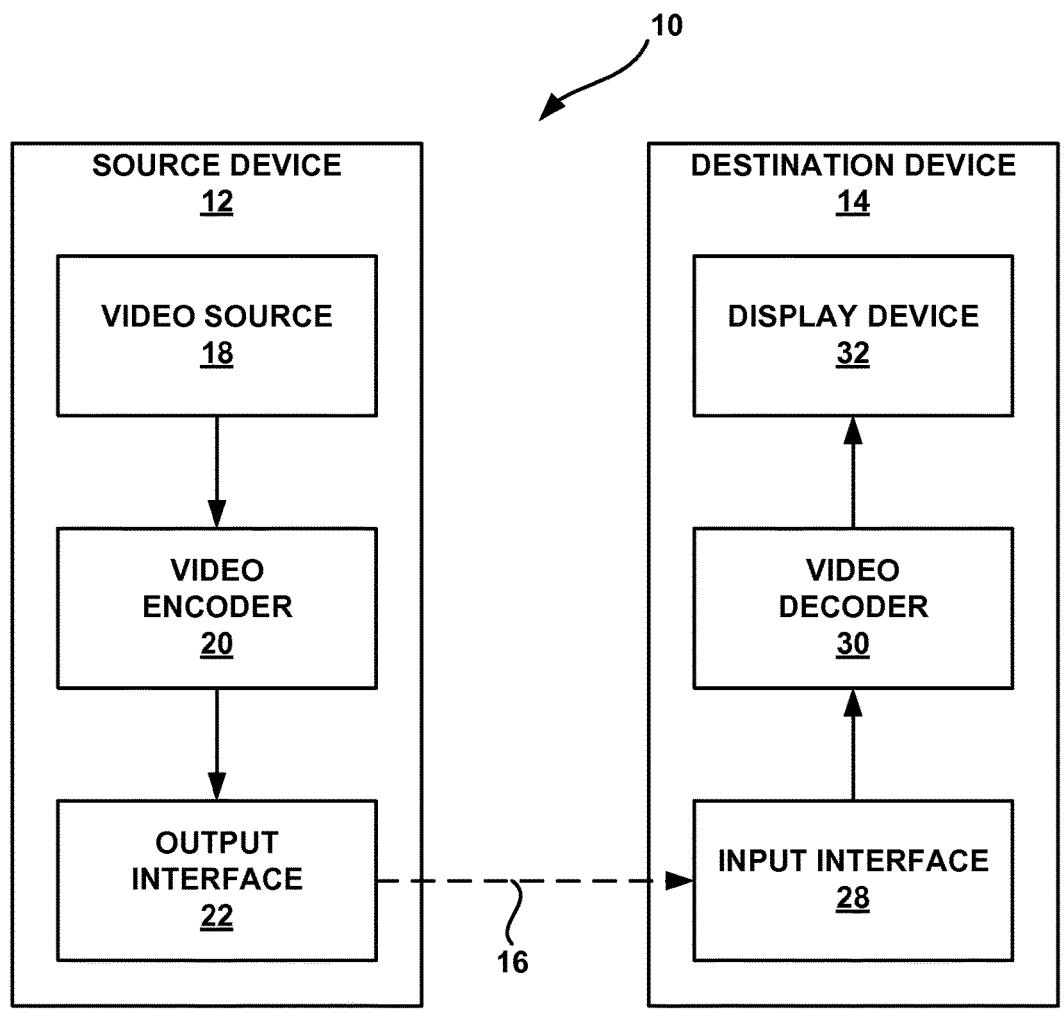
FIG. 1 is a block diagram illustrating an example of a video encoding and decoding system that may utilize techniques in accordance with aspects described in this disclosure.

Certain embodiments described herein relate to inter-layer prediction for scalable video coding in the context of advanced video codecs, such as HEVC (High Efficiency Video Coding). More specifically, the present disclosure relates to systems and methods for improved performance of inter-layer prediction in scalable video coding (SVC) extension of HEVC. In the description below, H.264/AVC techniques related to certain embodiments are described; the HEVC standard and related techniques are also discussed. While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards: ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

Video compression techniques perform spatial (intra-picture) prediction and/or temporal (inter-picture) prediction to reduce or remove redundancy inherent in video sequences. For block-based video coding, a video slice (e.g., a video frame, a portion of a video frame, etc.) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy encoding may be applied to achieve even more compression.

As discussed above, in the HEVC extension, there can be two motion vector prediction modes: merge mode and AMVP mode. For example, merge mode refers to one or more video coding modes in which motion information (such as motion vectors, reference frame indexes, prediction directions, or other information) for a current video block to be coded is inherited from a spatially neighboring video block in the same picture that contains the current video block, or a co-located video block in a different picture (e.g., temporal picture, picture in another layer, or picture in another view). The spatially neighboring blocks in the same picture may be referred to as spatial candidate blocks. The co-located block in a different picture may be referred to as a co-located candidate block. An index value may be used to identify the spatially neighboring block or co-located block from which the current video block inherits its motion information (e.g., a top, top right, left, left bottom block, relative to the current block, or a co-located block from a temporally adjacent picture, block from another layer, or block from another view).

Skip mode may comprise one type of merge mode (or a mode similar to merge mode). In skip mode, motion information is inherited, but no residual information is coded. Residual information may generally refer to pixel difference information indicating pixel differences between the block to be coded and a predictive block identified by the motion information inherited from the spatially neighboring block or co-located block. Direct mode may be another type of merge mode (or mode similar to merge mode). Direct mode may be similar to skip mode in that motion information is inherited, but in direct mode, a video block is coded to include residual information. The phrase "merge mode" is used herein to refer to any one of these modes, which may be called skip mode, direct mode, or merge mode.

AMVP mode may be similar to merge mode. However, in AMVP mode, the video coder also codes a reference index into a reference picture list (which is different from the list of candidate motion vector predictors) that identifies the picture used for inter-prediction. In other words, in AMVP mode, the video coder may not inherit the reference frame indexes; rather, the reference frame indexes may be signaled. Also, in some embodiments, in AMVP mode, the video coder may code a motion vector difference (MVD). The MVD is the difference between the actual motion vector of the block and the motion vector predictor, which is identified by the index into the list of candidate motion vector predictors.

Thus, rather than encoding and communicating the motion vector itself, a video encoder (e.g., video encoder 20 of FIG. 2) may encode and communicate the motion vector difference (MVD) relative to a known (or knowable) motion vector. In H.264/AVC, the known motion vector, which may be used with the MVD to define the current motion vector, can be defined by a so-called motion vector predictor (MVP), which is derived as the median of motion vectors associated with neighboring blocks. However, more advanced MVP techniques may allow the video encoder to select the neighbor from which to define the MVP.

For purposes of illustration only, certain embodiments disclosed herein are described with examples including only two layers (e.g., lower level layer such as the base layer, and a higher level layer such as the enhancement layer). It should be understood that such examples may be applicable to configurations including multiple base and/or enhancement layers. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

HEVC generally follows the framework of previous video coding standards in many respects. The unit of prediction in HEVC is different from that in certain previous video coding standards (e.g., macroblock). In fact, the concept of macroblock does not exist in HEVC as understood in certain previous video coding standards. Macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but it does not restrict the maximum size and may allow recursive splitting into four equal size CUs to improve the content adaptivity. PU may be considered the basic unit of inter/intra prediction and it may contain multiple arbitrary shape partitions in a single PU to effectively code irregular image patterns. TU may be considered the basic unit of transform. It can be defined independently from the PU; however, its size may be limited to the CU to which the TU belongs. This separation of the block structure into three different concepts may allow each to be optimized according to its role, which may result in improved coding efficiency.

Video Coding Standards

A digital image, such as a video image, a TV image, a still image or an image generated by a video recorder or a computer, may consist of pixels arranged in horizontal and vertical lines. The number of pixels in a single image is typically in the tens of thousands. Each pixel typically contains luminance and chrominance information. Without compression, the quantity of information to be conveyed from an image encoder to an image decoder is so enormous that it renders real-time image transmission impossible. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions, all of which are incorporated by reference in their entireties.

In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Motion Picture Experts Group (MPEG). A recent draft of HEVC is available from http://phenix.it-sudparis.eu/jct/doc_end_user/documents/12_Geneva/wg11/JCTVC-L1003-v34.zip, as of Nov. 15, 2013, which is incorporated by reference in its entirety. The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description.

Video Coding System

FIG. 1 is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding.

As shown in FIG. 1, video coding system 10 includes a source device 12 and a destination device 14. Source device 12 generates encoded video data. Destination device 14 may decode the encoded video data generated by source device 12. Source device 12 and destination device 14 may comprise a wide range of devices, including desktop computers, notebook (e.g., laptop, etc.) computers, tablet computers, set-top boxes, telephone handsets such as so-called "smart" phones, so-called "smart" pads, televisions, cameras, display devices, digital media players, video gaming consoles, in-car computers, or the like. In some examples, source device 12 and destination device 14 may be equipped for wireless communication.

Destination device 14 may receive encoded video data from source device 12 via a channel 16. Channel 16 may comprise any type of medium or device capable of moving the encoded video data from source device 12 to destination device 14. In one example, channel 16 may comprise a communication medium that enables source device 12 to transmit encoded video data directly to destination device 14 in real-time. In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14.

In another example, channel 16 may correspond to a storage medium that stores the encoded video data generated by source device 12. In this example, destination device 14 may access the storage medium via disk access or card access. The storage medium may include a variety of locally accessed data storage media such as Blu-ray discs, DVDs, CD-ROMs, flash memory, or other suitable digital storage media for storing encoded video data. In a further example, channel 16 may include a file server or another intermediate storage device that stores the encoded video generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website, etc.), FTP servers, network attached storage (NAS) devices, and local disk drives. Destination device 14 may access the encoded video data through any standard data connection, including an Internet connection. Example types of data connections may include wireless channels (e.g., Wi-Fi connections, etc.), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over HTTP (DASH), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may be configured to encode the captured, pre-captured, or computer-generated video data. The encoded video data may be transmitted directly to destination device 14 via output interface 22 of source device 12. The encoded video data may also be stored onto a storage medium or a file server for later access by destination device 14 for decoding and/or playback.

In the example of FIG. 1, destination device 14 includes an input interface 28, a video decoder 30, and a display device 32. In some cases, input interface 28 may include a receiver and/or a modem. Input interface 28 of destination device 14 receives encoded video data over channel 16. The encoded video data may include a variety of syntax elements generated by video encoder 20 that represent the video data.

The syntax elements may describe characteristics and/or processing of blocks and other coded units, e.g., groups of pictures (GOPs). Such syntax elements may be included with the encoded video data transmitted on a communication medium, stored on a storage medium, or stored a file server.

Display device 32 may be integrated with or may be external to destination device 14. In some examples, destination device 14 may include an integrated display device and may also be configured to interface with an external display device. In other examples, destination device 14 may be a display device. In general, display device 32 displays the decoded video data to a user. Display device 32 may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in the example of FIG. 1, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Again, FIG. 1 is merely an example and the techniques of this disclosure may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, hardware, or any combinations thereof. When the techniques are implemented partially in software, a device may store instructions for the software in a suitable, non-transitory computer-readable storage medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

As mentioned briefly above, video encoder 20 encodes video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include sequence parameter sets, picture parameter sets, adaptation parameter sets, and other syntax structures. A sequence parameter set (SPS) may contain parameters applicable to zero or more sequences of pictures. A picture parameter set (PPS) may contain parameters applicable to zero or more pictures. An adaptation parameter set (APS) may contain parameters applicable to zero or more pictures. Parameters in an APS may be parameters that are more likely to change than parameters in a PPS.

To generate a coded picture, video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). Video encoder 20 may use quadtree partitioning to partition the video blocks of treeblocks into video blocks associated with CUs, hence the name "treeblocks."

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise data representing an encoded version of the treeblock.

When video encoder 20 generates a coded slice, video encoder 20 may perform encoding operations on (e.g., encode) the treeblocks in the slice according to a raster scan order. In other words, video encoder 20 may encode the treeblocks of the slice in an order that proceeds from left to right across a topmost row of treeblocks in the slice, then proceeds from left to right across a next lower row of treeblocks, and so on until video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, video encoder 20 may be able to access information generated by encoding treeblocks above and to the left of the given treeblock when encoding the given treeblock. However, video encoder 20 may be unable to access information generated by encoding treeblocks below and to the right of the given treeblock when encoding the given treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

Video encoder 20 may perform encoding operations on (e.g., encode) each CU of a treeblock according to a z-scan order. In other words, video encoder 20 may encode a top-left CU, a top-right CU, a bottom-left CU, and then a bottom-right CU, in that order. When video encoder 20 performs an encoding operation on a partitioned CU, video encoder 20 may encode CUs associated with sub-blocks of the video block of the partitioned CU according to the z-scan order. In other words, video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, video encoder 20 may be able to access information generated by encoding some CUs that neighbor the given CU when encoding the given CU. However, video encoder 20 may be unable to access information generated by encoding other CUs that neighbor the given CU when encoding the given CU.

When video encoder 20 encodes a non-partitioned CU, video encoder 20 may generate one or more prediction units (PUs) for the CU. Each of the PUs of the CU may be associated with a different video block within the video block of the CU. Video encoder 20 may generate a predicted video block for each PU of the CU. The predicted video block of a PU may be a block of samples. Video encoder 20 may use intra prediction or inter prediction to generate the predicted video block for a PU.

When video encoder 20 uses intra prediction to generate the predicted video block of a PU, video encoder 20 may generate the predicted video block of the PU based on decoded samples of the picture associated with the PU. If video encoder 20 uses intra prediction to generate predicted video blocks of the PUs of a CU, the CU is an intra-predicted CU. When video encoder 20 uses inter prediction to generate the predicted video block of the PU, video encoder 20 may generate the predicted video block of the PU based on decoded samples of one or more pictures other than the picture associated with the PU. If video encoder 20 uses inter prediction to generate predicted video blocks of the PUs of a CU, the CU is an inter-predicted CU.

Furthermore, when video encoder 20 uses inter prediction to generate a predicted video block for a PU, video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. Video encoder 20 may generate the predicted video block for the PU based on the reference blocks of the PU.

After video encoder 20 generates predicted video blocks for one or more PUs of a CU, video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

Video coder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may generate sets of syntax elements that represent the transform coefficients in the quantized transform coefficient block. Video encoder 20 may apply entropy encoding operations, such as Context Adaptive Binary Arithmetic Coding (CABAC) operations, to some of these syntax elements. Other entropy coding techniques such as content adaptive variable length coding (CAVLC), probability interval partitioning entropy (PIPE) coding, or other binary arithmetic coding could also be used.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a sequence parameter set, a picture parameter set, a coded slice, supplemental enhancement information (SEI), an access unit delimiter, filler data, or another type of data. The data in a NAL unit may include various syntax structures.

Video decoder 30 may receive the bitstream generated by video encoder 20. The bitstream may include a coded representation of the video data encoded by video encoder 20.

When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate predicted video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predicted video blocks and reconstructing the residual video blocks, video decoder 30 may reconstruct the video block of the CU based on the predicted video blocks and the residual video blocks. In this way, video decoder 30 may reconstruct the video blocks of CUs based on the syntax elements in the bitstream.

Video Encoder

Figure 2:
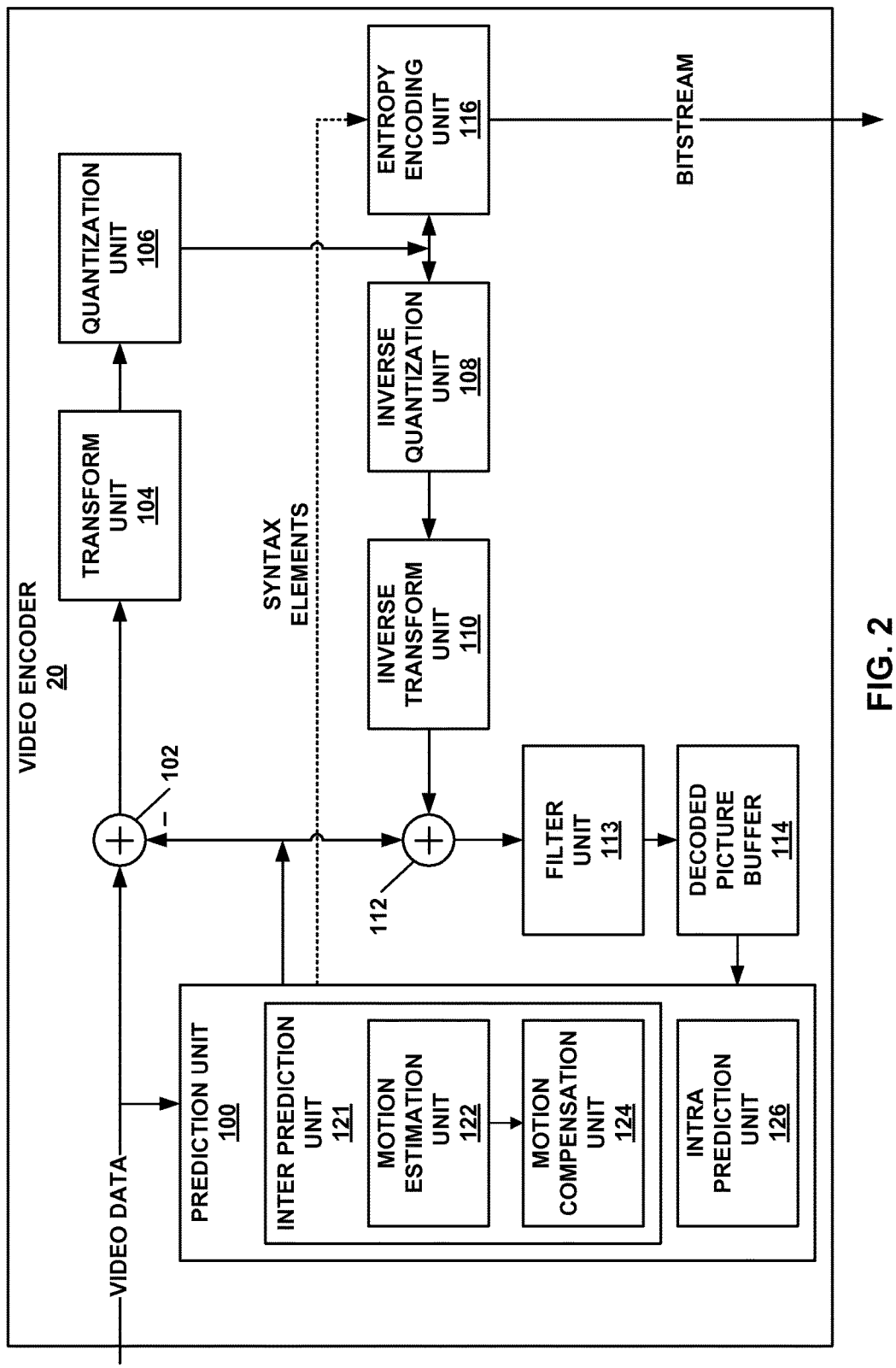
FIG. 2 is a block diagram illustrating an example of a video encoder that may implement techniques in accordance with aspects described in this disclosure.

FIG. 2 is a block diagram illustrating an example of a video encoder that may implement techniques in accordance with aspects described in this disclosure. Video encoder 20 may be configured to perform any or all of the techniques of this disclosure. As one example, prediction unit 100 may be configured to perform any or all of the techniques described in this disclosure. However, aspects of this disclosure are not so limited. In some examples, the techniques described in this disclosure may be shared among the various components of video encoder 20. In some examples, in addition to or instead of, a processor (not shown) may be configured to perform any or all of the techniques described in this disclosure.

For purposes of explanation, this disclosure describes video encoder 20 in the context of HEVC coding. However, the techniques of this disclosure may be applicable to other coding standards or methods.

Video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

In the example of FIG. 2, video encoder 20 includes a plurality of functional components. The functional components of video encoder 20 include a prediction unit 100, a residual generation unit 102, a transform unit 104, a quantization unit 106, an inverse quantization unit 108, an inverse transform unit 110, a reconstruction unit 112, a filter unit 113, a decoded picture buffer 114, and an entropy encoding unit 116. Prediction unit 100 includes an inter prediction unit 121, motion estimation unit 122, a motion compensation unit 124, and an intra prediction unit 126. In other examples, video encoder 20 may include more, fewer, or different functional components. Furthermore, motion estimation unit 122 and motion compensation unit 124 may be highly integrated, but are represented in the example of FIG. 2 separately for purposes of explanation.

Video encoder 20 may receive video data. Video encoder 20 may receive the video data from various sources. For example, video encoder 20 may receive the video data from video source 18 (FIG. 1) or another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction unit 100 may perform quadtree partitioning on the video block of the treeblock to divide the video block into progressively smaller video blocks. Each of the smaller video blocks may be associated with a different CU. For example, prediction unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction unit 100 may generate a hierarchical quadtree data structure for the treeblock. For example, a treeblock may correspond to a root node of the quadtree data structure. If prediction unit 100 partitions the video block of the treeblock into four sub-blocks, the root node has four child nodes in the quadtree data structure. Each of the child nodes corresponds to a CU associated with one of the sub-blocks. If prediction unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 generates data representing an encoded representation of the non-partitioned CU.

As part of performing an encoding operation on a CU, prediction unit 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, prediction unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples, that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

As further discussed below with reference to FIGS. 8-10, the prediction unit 100 may be configured to perform motion estimation by performing the methods illustrated in FIGS. 8-10.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to determine the motion vector of the PU. By referring to the motion information of a first PU when signaling the motion information of a second PU, video encoder 20 may be able to signal the motion information of the second PU using fewer bits.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction unit 100 may select the prediction data for a PU from among the prediction data generated by motion compensation unit 124 for the PU or the prediction data generated by intra prediction unit 126 for the PU. In some examples, prediction unit 100 selects the prediction data for the PU based on rate/distortion metrics of the sets of prediction data.

If prediction unit 100 selects prediction data generated by intra prediction unit 126, prediction unit 100 may signal the intra prediction mode that was used to generate the prediction data for the PUs, e.g., the selected intra prediction mode. Prediction unit 100 may signal the selected intra prediction mode in various ways. For example, it is probable the selected intra prediction mode is the same as the intra prediction mode of a neighboring PU. In other words, the intra prediction mode of the neighboring PU may be the most probable mode for the current PU. Thus, prediction unit 100 may generate a syntax element to indicate that the selected intra prediction mode is the same as the intra prediction mode of the neighboring PU.

After prediction unit 100 selects the prediction data for PUs of a CU, residual generation unit 102 may generate residual data for the CU by subtracting the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform unit 104 may generate one or more transform coefficient blocks for each TU of a CU by applying one or more transforms to a residual video block associated with the TU. Each of the transform coefficient blocks may be a 2D matrix of transform coefficients. Transform unit 104 may apply various transforms to the residual video block associated with a TU. For example, transform unit 104 may apply a discrete cosine transform (DCT), a directional transform, or a conceptually similar transform to the residual video block associated with a TU.

After transform unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction unit 100 to produce a reconstructed video block associated with a TU. By reconstructing video blocks for each TU of a CU in this way, video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of video encoder 20. For example, entropy encoding unit 116 may receive transform coefficient blocks from quantization unit 106 and may receive syntax elements from prediction unit 100. When entropy encoding unit 116 receives the data, entropy encoding unit 116 may perform one or more entropy encoding operations to generate entropy encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Video Decoder

Figure 3:
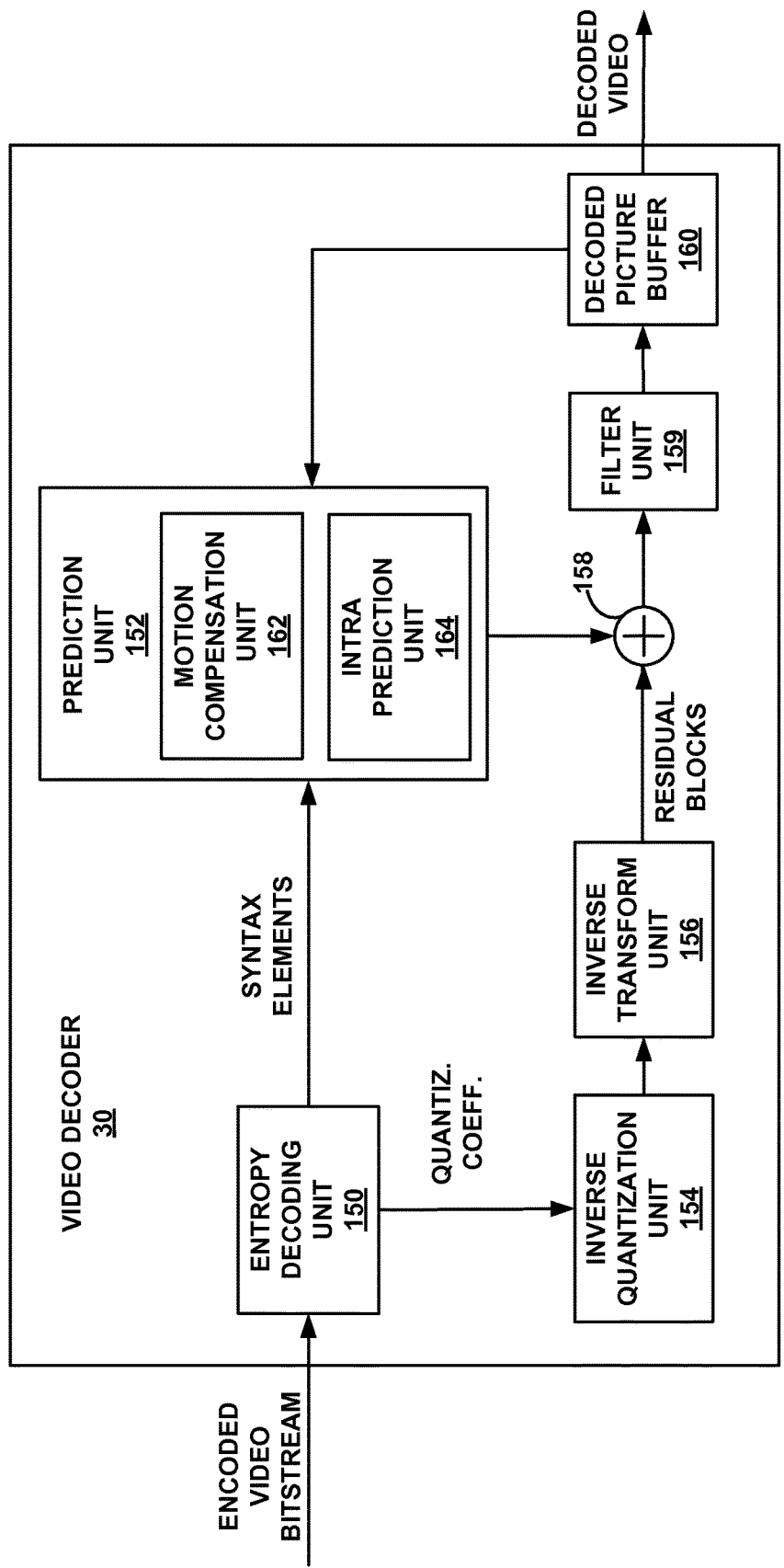
FIG. 3 is a block diagram illustrating an example of a video decoder that may implement techniques in accordance with aspects described in this disclosure.

FIG. 3 is a block diagram illustrating an example of a video decoder that may implement techniques in accordance with aspects described in this disclosure. Video decoder 30 may be configured to perform any or all of the techniques of this disclosure. As one example, motion compensation unit 162 and/or intra prediction unit 164 may be configured to perform any or all of the techniques described in this disclosure. However, aspects of this disclosure are not so limited. In some examples, the techniques described in this disclosure may be shared among the various components of video decoder 30. In some examples, in addition to or instead of, a processor (not shown) may be configured to perform any or all of the techniques described in this disclosure.

In the example of FIG. 3, video decoder 30 includes a plurality of functional components. The functional components of video decoder 30 include an entropy decoding unit 150, a prediction unit 152, an inverse quantization unit 154, an inverse transform unit 156, a reconstruction unit 158, a filter unit 159, and a decoded picture buffer 160. Prediction unit 152 includes a motion compensation unit 162, and an intra prediction unit 164. In some examples, video decoder 30 may perform a decoding pass generally reciprocal to the encoding pass described with respect to video encoder 20 of FIG. 2. In other examples, video decoder 30 may include more, fewer, or different functional components.

Video decoder 30 may receive a bitstream that comprises encoded video data. The bitstream may include a plurality of syntax elements. When video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by video encoder 20 during generation of the predicted video block of the PU to calculate interpolated values for sub-integer samples of a reference block. Motion compensation unit 162 may determine the interpolation filters used by video encoder 20 according to received syntax information and use the interpolation filters to produce the predicted video block.

As further discussed below with reference to FIGS. 8-10, the prediction unit 152 (e.g., via the motion compensation unit 162) may perform motion compensation by performing the methods illustrated in FIGS. 8-10.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

Reconstruction unit 158 may use the residual video blocks associated with TUs of a CU and the predicted video blocks of the PUs of the CU, e.g., either intra-prediction data or inter-prediction data, as applicable, to reconstruct the video block of the CU. Thus, video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, video decoder 30 may store the video block of the CU in decoded picture buffer 160. Decoded picture buffer 160 may provide reference pictures for subsequent motion compensation, intra prediction, and presentation on a display device, such as display device 32 of FIG. 1. For instance, video decoder 30 may perform, based on the video blocks in decoded picture buffer 160, intra prediction or inter prediction operations on PUs of other CUs.

Candidate List Construction

FIG. 4A illustrates an example of sub-block 400 that is to be predicted, and FIG. 4B is a conceptual diagram illustrating a list 410 of candidate motion vectors for sub-block 400 (e.g., merge candidate list). An AMVP candidate list may be similarly derived as shown in FIG. 4B. Examples of sub-block 400 include, but are not limited to, a largest coding unit (LCU), a coding unit (CU), a prediction unit (PU), a transform unit (TU), or any sub-block level. Sub-block 400 may be a portion of a larger block (hence the term sub-block). For example, sub-block 400 may be a PU of a CU. In this example, the CU may be referred to as a current block and the PU may be referred to as a sub-block. The current block may include one or more sub-blocks. However, it may be possible that sub-block 400 is the largest possible block, and in such case, sub-block 400 may just be considered as a block.

In FIG. 4A, LA, L, BL, A and RA refer to neighboring blocks of sub-block 400. The motion vectors for each of these neighboring blocks may potentially be candidates for the merge list 410. For example, FIG. 4B illustrates spatial motion vectors 411-414. Each of these motion vectors may correspond to a motion vector for one of the neighboring blocks LA, L, BL, A and RA shown in FIG. 4A.

FIG. 4A illustrates a block T. This block T should not be interpreted to mean that it is a neighboring block of sub-block 400. Rather, this block T refers to a temporally co-located block of sub-block 400. The temporally co-located block resides in a picture (e.g., another picture in the same layer or view, or in a base layer or a base view) other than the picture that includes the current block (e.g., sub-block 400). The temporally co-located block may be located in the same position in said other picture as where sub-block 400 is located in its picture. For example, if sub-block 400 is located in a first picture, the temporally co-located block is located in a second picture. The block T may indicate that there is a temporal motion vector predictor (TMVP).

In some embodiments, block T may refer to the co-located block, where the co-located block is located in a picture (e.g., second picture) in a different layer than the picture (e.g., first picture) that includes sub-block 400. In other embodiments, block T may refer to the co-located block, where the co-located block is located in a picture (e.g., second picture) in a different view than the picture (e.g., first picture) that includes sub-block 400.

As illustrated in FIG. 4B, the merge list 410 may include a TMVP 415. A list for AMVP may be similarly derived. The TMVP 415 is a motion vector for the temporally co-located block in the second picture. In some embodiments, a list, such as the list 410 shown in FIG. 4B, may include a motion vector for the co-located block in another layer or in another view.

In some instances, the video coder (e.g. encoder or decoder) may need to determine certain information for the second picture so that the video coder can code (e.g. encode or decode) sub-block 400. For example, once the video coder determines such information for the second picture, the video coder can determine where the motion vector for the co-located block, which is in the second picture, points. After the video coder determines where the motion vector for the co-located block points, the video coder may code sub-block 400 based on the block to which the motion vector of the co-located block points. Thus, the video coder may code sub-block 400 using the motion information of its co-located block in a different layer or view.

Such information determined for the second picture may be a reference frame (e.g., picture) index. For example, sub-block 400 may be a PU. In the current HEVC test model, the reference frame index (which is also called reference index) for TMVP candidate is derived from the reference index(es) of the left neighbor PU at location L in FIG. 4A. If the reference index of the left neighbor PU at location L is not available, e.g., the PU is uni-predicted or it is intra coded, that reference index is set to zero.

There may be potential inefficiencies in the current HEVC test model. For example, a merge candidate list may need to be generated for every sub-block level. For purposes of illustration and ease of understanding only, the techniques are described with examples of a PU in the CU. However, these techniques are applicable to a LCU, a CU, a PU, a TU, a group of LCUs, CUs, PUs, and TUs, or any sub-block level.

The list may be generated for every PU in a CU, so motion vectors for co-located blocks (e.g., blocks in a temporal picture, blocks in a picture in a different view, or blocks in a picture in a different layer) may be derived for every PU as well. Determining the motion vectors for co-located block may be complex, since such determination includes locating a corresponding block (e.g., co-located block) in the reference frame, scaling the motion vector (MV) of the block based on picture order count (POC) distances and deriving reference frame (e.g., picture) indexes.

In some embodiments, a video coder (e.g., encoder or decoder) may derive the motion vector information for a co-located block only once per CU and use it as a common motion vector predictor candidate for all PUs in the CU. In some embodiments, generating only one motion vector candidate from the co-located block and sharing it for all PUs may potentially reduce complexity.

In some embodiments, the spatial MV candidate location may be the same as that specified in the current definition in the HEVC working draft. In other words, each PU in a CU may have a different set of spatial MV candidates. However, in some embodiments, a single co-located motion vector predictor candidate is used for every PU in the CU. The term "co-located motion vector predictor" means the motion vector for the co-located block that forms a predictor for predicting the motion vector for the current block.

FIGS. 5A-5I are block diagrams illustrating examples of candidate locations for different partition modes. FIGS. 5A-5I may illustrate a single co-located block candidate for different partition modes. Also, although not specifically illustrated in FIGS. 5A-5I, the techniques may apply to AMP (asymmetric motion partition) modes or other block partitioning as well. Also, in these examples, the techniques may apply to any partition configuration (e.g., any size and any number of partitions). For example, the partitions may be considered partition units or prediction units.

For instance, in the examples of FIGS. 5A-5I, the location of the co-located block of sub-block 400 (e.g., shown in FIG. 4A) in the second picture (e.g., a picture other than that containing sub-block 400) may be the same regardless of the partition mode. This is illustrated by the block T which is located in the same position in each one of FIGS. 5A-5I. Also, in some examples, the second picture may be identified based on the reference picture referred to by the motion vector of the spatial neighbor L (e.g., shown in FIG. 4A). However, aspects of this disclosure are not so limited, and any one of the spatial neighbor sub-blocks may be used to identify the second picture. Moreover, it may be possible to signal the identity of the second picture, which again may be a temporal picture, a picture in another layer (e.g., base layer), or a picture in another view (e.g., base view).

In this way, the video coder may identify the second picture. The video coder may then identify the co-located block within the second picture that is co-located with the current block in the first picture. The video coder may determine the motion vector of the co-located block within the second picture, and assign that motion vector as the co-located motion vector predictor candidate for all of the sub-blocks within the current block of the first picture. Again, "co-located motion vector predictor" means the motion vector for the co-located block that forms a predictor for predicting the motion vector for the current block.

For example, FIGS. 5A-5I illustrate a current block (e.g., a CU) having one sub-block (e.g., PU0 in FIG. 5A), two sub-blocks (e.g., PU0 and PU1 in FIGS. 5B-5E), or four sub-blocks (e.g., PU0-PU3 in FIGS. 5F-5I). For example, the CU of FIGS. 5A-5I is in a first picture, as discussed above. In some embodiments, the video coder may identify the co-located motion vector predictor for the entire CU based on the co-located block in the second picture, for each of the partition modes shown in FIGS. 5A-5I. The video coder may then assign this co-located motion vector predictor to each of the PUs, regardless of the partition (e.g., size and number of partitions).

In FIGS. 5A-5I, regardless of the partition modes, the location of the co-located block may always be fixed, according to an embodiment of the present disclosure. It should be understood that the locations shown in FIGS. 5A-5I is just one example. In other embodiments, other locations neighboring the current CU may be used as the location for determining the co-located located motion vector predictor. In some embodiments, advantages of having a single co-located block location regardless of partition modes may be that all partition modes can share the same module for deriving the co-located motion vector predictor (e.g., the motion vector for the co-located block that forms a predictor for predicting the motion vector for the current block).

In some embodiments, the location of the single co-located block may be different based on the partition mode. For example, for a given partition mode, a fixed location may be used to derive a co-located motion vector predictor which is to be shared among all PUs in the CU. However, for a different partition mode, a different fixed location may be used for deriving the co-located motion vector predictor which is to be shared among all PUs in the CU having that partition mode.

Figure 5A:
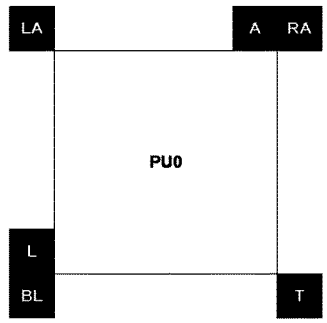
FIGS. 5A-5I are block diagrams illustrating examples of candidate locations for different partition modes.
Figure 5B:
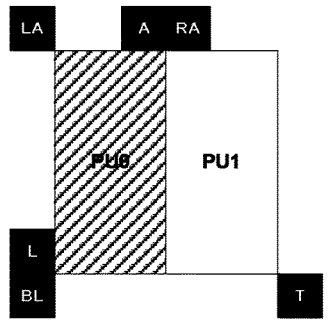
Figure 5C:
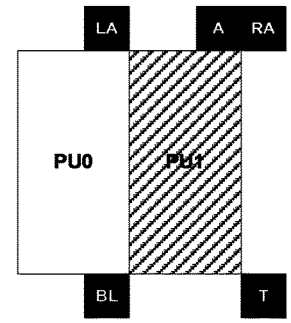
Figure 5D:
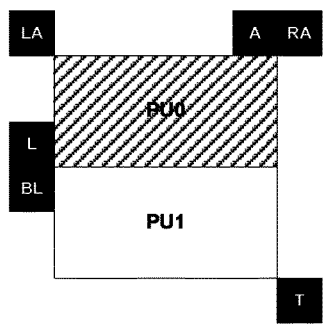
Figure 5E:
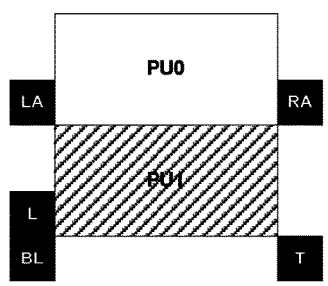
Figure 5F:
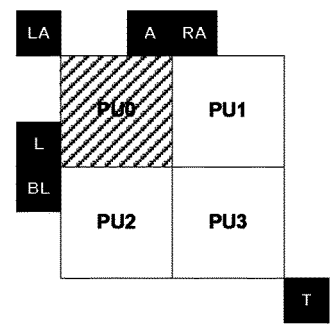
Figure 5G:
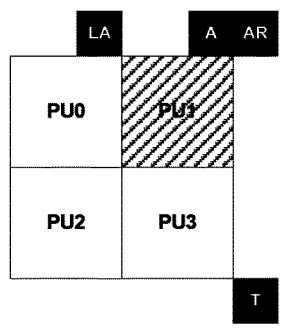
Figure 5H:
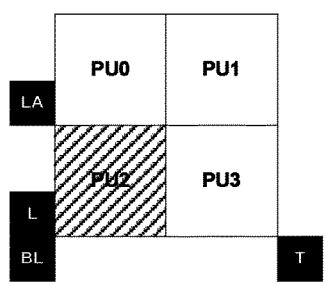
Figure 5I:
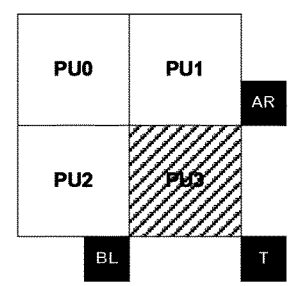
Figure 6A:
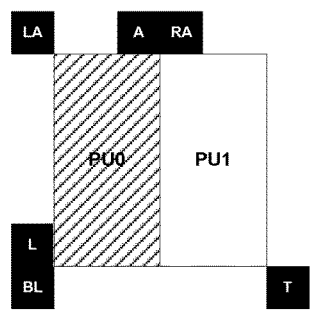
FIGS. 6A-6E are block diagrams illustrating examples of different candidate locations for different partition modes.
Figure 6B:
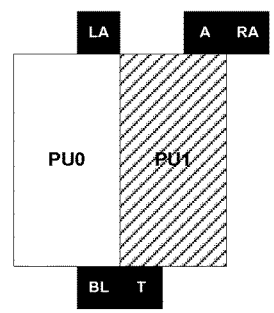

For example, for a 2N×2N mode, the location of the co-located block shown in FIG. 5A may be used. However, for N×2N mode, a different location of the co-located block may be used, as illustrated in FIGS. 6A and 6B. FIGS. 6A and 6B are block diagrams illustrating examples of different merge candidate locations for different partition units, and the same may apply for AMVP mode. FIGS. 6A and 6B may illustrate a single co-located block location for PU0 of N×2N mode. Similar to FIGS. 5A-5I, the location of the co-located block illustrated in FIGS. 6A and 6B are just one example. Other locations neighboring the current CU may also be used as the location for determining the co-located motion vector predictor (e.g., the motion vector for the co-located block that forms a predictor for predicting the motion vector for the current block) under this partition mode.

Figure 6C:
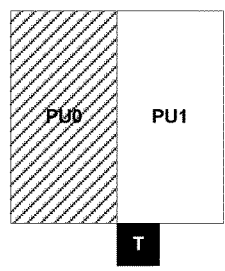
Figure 6D:
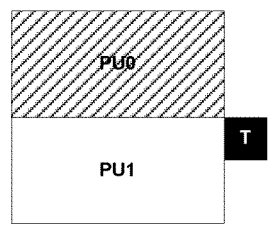
Figure 6E:
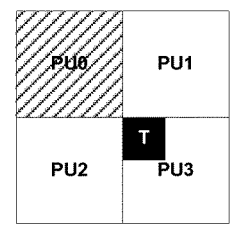

As discussed above, in some embodiments, the locations of the co-located blocks may be based on the partition mode. FIGS. 6C-6E are block diagrams illustrating examples of different merge candidate locations based on the partition mode, and the same may apply for AMVP mode. As shown in FIGS. 6C-6E, the location of the T block (e.g., representing the temporally co-located block) is different for each of the various partition modes of FIGS. 6C-6E.

As discussed above, in some embodiments, the location of the co-located block may be signaled. For example, a video encoder may signal the location of the co-located block, and a video decoder may receive the location of the co-located block. To signal the location, the video encoder may encode the location, and to receive the location, the video decoder may decode the encoded signal. This process may be commonly referred to as the video coder coding the location (e.g., video encoder encoding the signal, and video decoder decoding the signal).

The location of the co-located block may be signaled in the CU header, slice header, picture level, sequence parameter set (SPS), picture parameter set (PPS), or any other level.

The techniques of this disclosure may also provide a mechanism to reset reference index for TMVP, but these techniques may be applicable to examples where the co-located block is located in a base layer or a base view. For example, in the current HEVC test model (HM), for both reference list L0 and L1, the TMVP reference index of a current PU is derived from the reference index of its left neighbor PU. In some examples, if a reference index of its left neighbor PU is not available, the corresponding reference index for TMVP is set to 0; otherwise, the corresponding reference index for TMVP is set equal to the reference index of its left neighbor PU.

In example techniques described in this disclosure, when deriving reference indexes for a bi-predicted TMVP for a current PU (e.g., predicted with reference to two pictures), if a reference index for one reference list, e.g., L0, of its left neighbor PU is not available, the corresponding reference index for TMVP is not immediately set to 0. Instead, it may be beneficial to check the reference index from another list, e.g., L1, of the left neighbor PU. If such reference index is available, the video coder may assign that reference index value to the TMVP reference index for the current list, e.g., L0.

One possible implementation may be as follows:
1. Derive reference indices refIdx0 and refIdx1 from the left PU.
2. If refIdx0 is not available but refIdx1 is available, then set refIdx0=refIdx1, otherwise set refIdx0=0.
3. If refIdx1 is not available but refIdx0 is available, then set refIdx1=refIdx0, otherwise set refIdx1=0.

In the example above, the left neighbor PU is used for TMVP reference index derivation. However, if a different spatial or temporal location other than the left neighbor PU is used for TMVP reference index derivation, the techniques of this disclosure is also applicable to such case.

Parallel Motion Estimation (PME)

In the current HEVC, there are two motion vector candidate list construction processes; one is a regular process and another is a parallel motion estimation (PME) style process. For the regular candidate list construction process, unavailable motion vector (MV) candidates are skipped from the candidate list construction. For example, an MV candidate can be unavailable if the corresponding block does not have motion information (e.g., intra coded), or has not yet been coded, or motion information is similar or equal to an MV candidate already inserted into the list (which is also known as a pruned out MV candidate).

Figure 7:
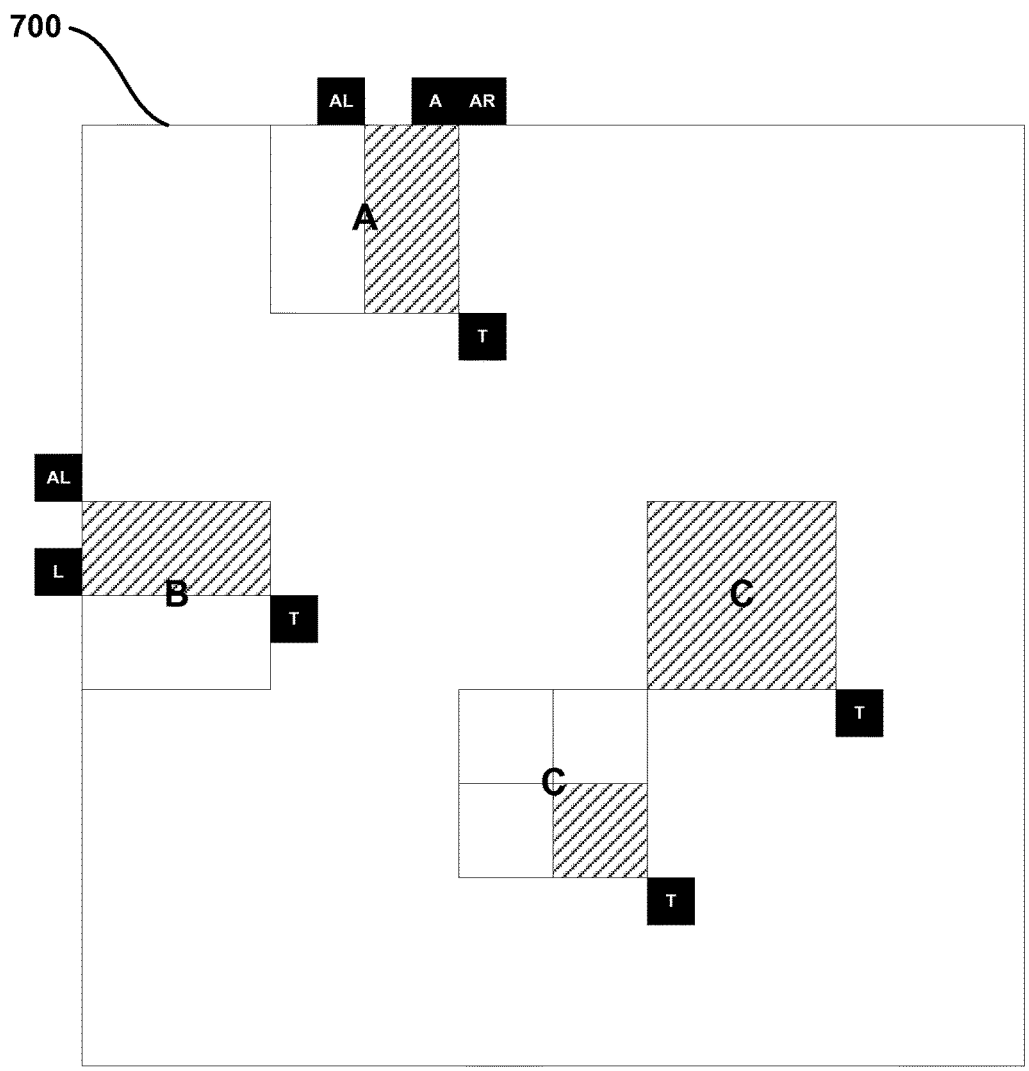
FIG. 7 is a diagram illustrating coding units and prediction units within a parallel motion estimation region.

The PME style candidate list construction process is used for parallel motion estimation. For example, parallel motion estimation (PME) can be enabled by signaling the size of the PME area, and if it is not zero, e.g., the size is bigger than 4×4, PME-style merge or AMVP candidate list construction is applied for the blocks located inside of the PME region 700 as shown on FIG. 7.

The difference between the PME-style candidate list construction and the regular candidate list construction is that spatial candidates located completely inside of the PME region (e.g., PME region 700 shown in FIG. 7) cannot be used as candidates. Only spatial candidates that are outside of the PME region can be used. For example, blocks that are located at the border of the PME region 700 of FIG. 7 (e.g., CUs "A" and "B" in FIG. 7) may have spatial candidates that are outside of the PME region 700, as illustrated by the spatial blocks AL, L, A and AR located outside the PME region 700 in FIG. 7. The blocks that do not share the border of the PME region 700 (e.g., CUs "C") can have only temporal motion vector predictor (TMVP) candidate. If the candidate list is still not completed (e.g., the list is empty or contains less than a predetermined number of candidates) after all the spatial and temporal candidates have been added, artificial MV candidates (e.g., 0,0 vectors) may be added to the candidate list.

Because the PME-style candidate list construction eliminates any candidate list dependency within a PME region, motion estimation can be done in parallel for any particular PME region.

For example, for particular block sizes such as 8×8 CUs wherein MER (motion estimation region, e.g., region 700 shown in FIG. 7) is enabled, the single candidate list construction may be applied (e.g., spatial candidates are generated only once for all PUs in a CU or a group of CUs). That is, for any affected CUs, spatial candidates for the PU are derived only once for all PUs within the CU, and only the TMVP is derived for each PU. For example, if CU is 8×8 and it is coded with 2N×N partition, the spatial candidates for PU1 and PU2 are derived once as it is for CU 8×8 2N×2N, and only the TMVP is derived for each PU.

Base Layer Motion Vectors

In HEVC extensions, the base layer motion vectors (BL MV) can be used as candidates for merge mode or AMVP mode. However, when BL MVs are included into the candidate list and single candidate list generation (e.g., spatial candidates are generated only once for all PUs in a CU or a group of CUs) is enabled with motion estimation region (MER), the method of adding those BL MVs needs to be defined.

The embodiments disclosed herein are applicable to the HEVC extensions, such as SVC, MVC, or 3DV. In some embodiments, the motion field from the base layer/view can be used, in addition to the spatial and temporal candidates, for coding (e.g., encoding or decoding) the enhancement layer/view. For the SVC case, a base layer motion field can be scaled according to the spatial aspect ratio, and embodiments are described assuming that the scaling is applied if the base and enhancement layers have different resolutions. For the 3DV and MVC cases, the base view disparity motion vector can be applied in a manner similar to that of the SVC extension.

For the purposes of illustration, embodiments are described for the SVC extension. However, other embodiments include 3DV, MVC or other extensions, where extra non-spatial and non-temporal motion field is available for the current picture coding, and the techniques described herein can be applied to such embodiments in a similar manner.

In one embodiment, a coding system and a method, which include defining the behavior of generating and adding BL MVs when single candidate list construction is enabled, are disclosed. It should be appreciated that the single candidate list construction can be enabled without MER (motion estimation region, e.g., region 700 of FIG. 7). However, in the current HEVC, the single list construction is enabled only in conjunction with MER.

Figure 8:
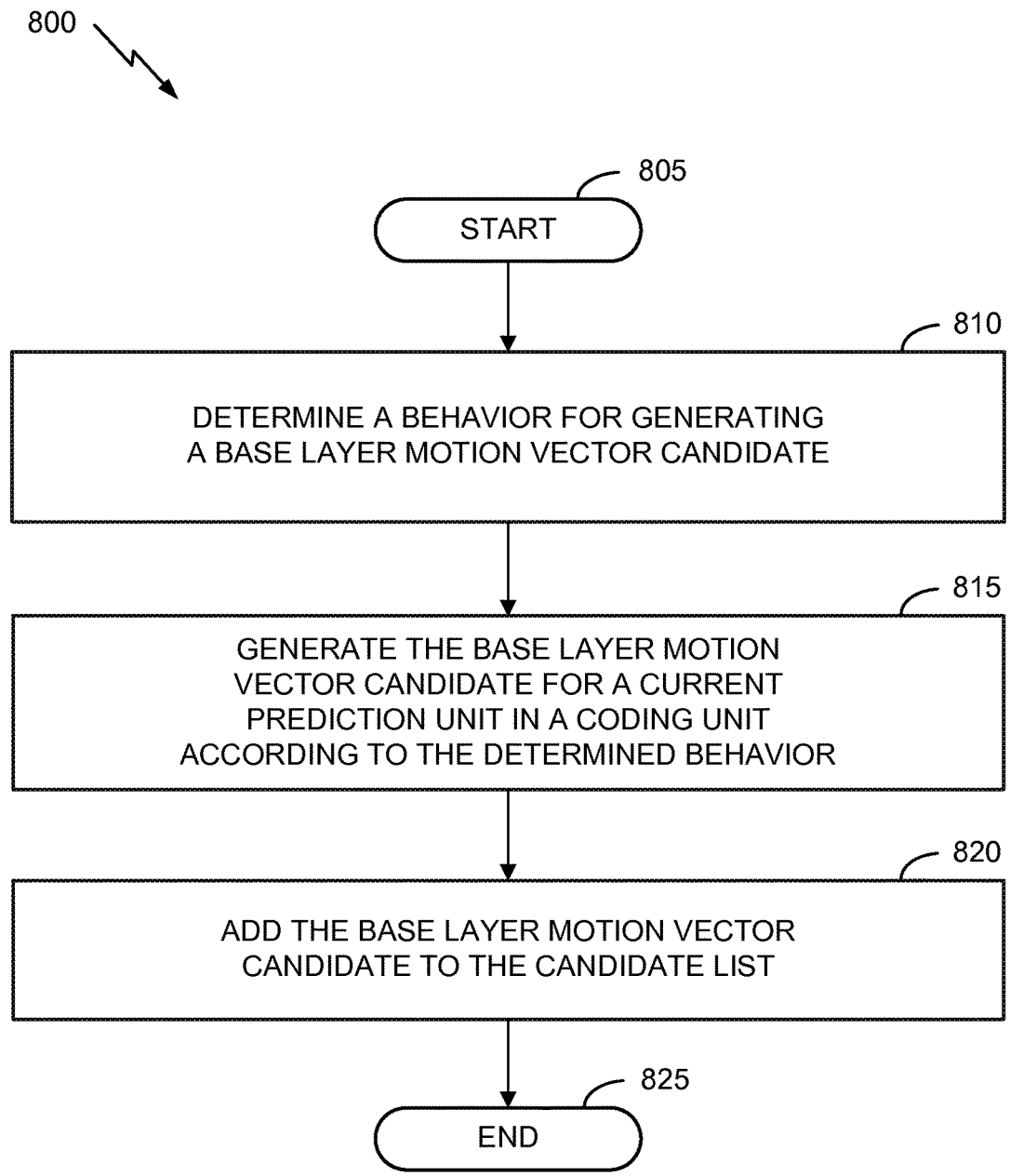
FIG. 8 is a flow chart illustrating a method of coding video information, according to one embodiment of the present disclosure.

FIG. 8 is a flowchart illustrating a method 800 for coding video information, according to an embodiment of the present disclosure. The method 800 illustrated in FIG. 8 may be performed by an encoder (e.g., the video encoder 20 as shown in FIG. 2), a decoder (e.g., the video decoder 30 as shown in FIG. 3), or any other component. For convenience, the method 800 is described as performed by a coder, which may be the encoder, the decoder or another component.

The method 800 begins at block 805. In block 810, the coder determines a behavior for generating a base layer motion vector candidate. The behavior may specify how the base layer motion vector candidate is to be generated and added to the candidate list. For example, such behavior may be specified for every prediction unit (PU). In some embodiments, more than one BL MV may be added. In block 815, the coder generates the base layer motion vector candidate for a current PU in a particular coding unit (CU) according to the behavior determined by the coder. For example, the behavior may specify that the BL MV candidate should be generated for every PU or just once for the particular CU. In block 820, the generated BL MV candidate is added to the candidate list. The method 800 ends at block 825.

As briefly discussed above, for single candidate list generation, a BL MV (one or multiple) may be generated and added to the candidate list in a number of different ways. In one embodiment, the one or more BL MV candidates are generated for every PU, and spatial candidates are generated only once for the particular CU (e.g., 8×8), and TMVP is again derived for each PU. In another embodiment, the one or more BL MV candidates and spatial candidates are generated only once for the particular CU (e.g., 8×8), and the TMVP is again derived for each PU. In yet another embodiment, the one or more BL MV candidates, spatial candidates and TMVP are generated only once for the particular CU (e.g., 8×8). Thus, according to embodiments of the present disclosure, the method for treating BL MV candidates when they are determined and added to the candidate list in the case of single candidate list construction, is defined. In one embodiment, BL MV candidates may be treated as spatial candidates, temporal candidates or any other candidates.

However, in certain embodiments, not all candidates may be present in the candidate list. For example, the spatial candidates and/or the TMVP may be unavailable because the corresponding blocks (and the neighboring blocks thereof) are intra coded. Thus, the generation and derivation of the candidates discussed above are subject to the availability of the motion information.

Other Uses of Base Layer Motion Vectors

EXAMPLE 1

For Unavailable Motion Vector Candidates, Motion Information is Derived from Corresponding Blocks from the Base Layer For example, for blocks inside the PME region, spatial candidates are not available. For regular merge mode, candidates may not be available if the neighbor block is intra coded.

Instead of such unavailable spatial candidates, the base layer candidates can be derived from the base layer co-located blocks corresponding to the location of the spatial neighbor blocks in the enhancement layer. For example, instead of the left spatial candidate, the left candidate of the co-located block located in the base layer can be used.

For example, the same process as the single layer process of the merge list construction can be invoked, but just instead of using spatial neighbor candidates of a current block in the enhancement layer, spatial neighbor candidates of the co-located block can be used.

Alternatively, locations other than the co-located block of the spatial neighbor may be used to derive motion information from the base layer. In general, any sub-block, inside or outside of the co-located block, can be used for base layer motion information generation. For example, any center sub-block or any corner sub-block of the co-located block can be used. In another example, bottom right sub-block outside of the co-located, similar to TMVP generation, block can be used.

Replacement of the unavailable merge candidate with the base layer motion candidates can be done either only for regular candidate list construction, or only for PME style candidate list construction or for both cases.

EXAMPLE 2

TMVP is Replaced with a Base Layer Motion Vector

In addition (or alternatively) to spatial candidate replacement, an unavailable TMVP candidate can be replaced with a base layer motion vector candidate. Similarly, any sub-block can be used, but for unification purpose only bottom right sub-block outside of the co-located bloc can be used for TMVP replacement.

Replacement of the unavailable TMVP candidate with the base layer motion candidates can be done either only for regular candidate list construction, or only for PME style candidate list construction or for both cases.

Alternatively, TMVP can be replaced with the base layer candidate (for example, bottom right mentioned in the above example) even if the current TMVP is available, only for PME style merge. In another embodiment, this TMVP replacement is only done for PME region and for the block located completely inside the region, e.g., no boundary sharing. Since, for these blocks, regular spatial candidates are not involved in the candidate list construction, and if the TMVP is also replaced, then the complete candidate list construction can be performed using the co-located block in the base layer.

EXAMPLE 3

Supplementing Motion Vector Candidate

For B-slices, if the motion vector candidate is uni-directional, then another direction can be derived from the base layer. For the derivation purpose, any sub-block can be used, but for unification purpose the corresponding co-located block can be used.

For example, spatial left candidate of the current block may only have a uni-directional MV from the reference list L0. Then, the motion vector for the reference list L1 from the spatial left candidate of the co-located base layer block can be derived and supplement the current motion vector candidates, making it bi-directional. It may improve the performance, since it is well known that bi-directional motion compensation is better than uni-directional one.

For TMVP case, bottom-right sub-block of the co-located block in the base layer can be used for MV derivation.

Supplementing motion vector candidates can be done either only for regular candidate list construction, or only for PME style candidate list construction, or for both cases.

Figure 9:
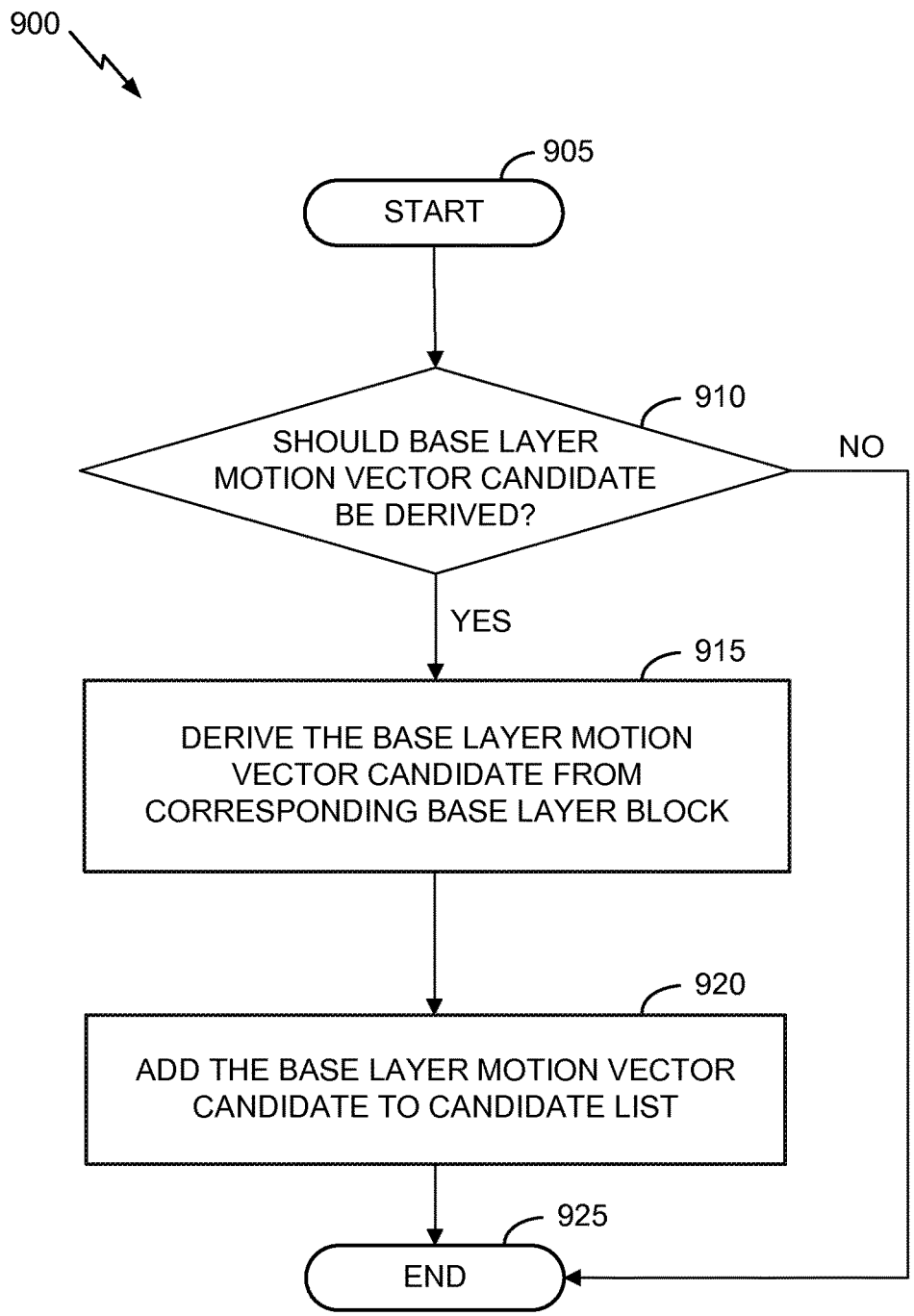
FIG. 9 is a flow chart illustrating a method of coding video information, according to one embodiment of the present disclosure.

FIG. 9 is a flowchart illustrating a method 900 for coding video information. The steps illustrated in FIG. 9 may be performed by an encoder (e.g., the video encoder 20 as shown in FIG. 2), a decoder (e.g., the video decoder 30 as shown in FIG. 3), or any other component. For convenience, the steps are described as performed by a coder, which may be the encoder, the decoder or another component.

The method 900 begins at block 905. In block 910, the coder determines whether base layer motion vector candidate should be derived. For example, as discussed above, such determination may be made based on whether motion information of the neighboring blocks is unavailable (e.g., because of the PME region or because the neighboring block is intra-coded). In another example, the determination may be made based on the location of the current block within the PME region (e.g., whether the block is completely inside the PME region such that it does share any boundaries with the boundary of the PME) when the TMVP is to be replaced with a base layer motion vector candidate. If it is determined that the base layer motion vector candidate should not be derived, the method 900 ends at block 925. If it is determined that base layer motion vector candidate should be derived, the coder derives the base layer motion vector candidate from a corresponding base layer block, as shown in block 915 of FIG. 9. For example, the corresponding block may be a co-located block in the base layer or a neighboring block of the co-located block in the base layer. In block 920, the coder adds the base layer motion vector candidate to the candidate list to be used for coding the block in the enhancement layer (or dependent view). The method 900 ends at block 925.

Deriving Base Layer Information For Group of Blocks

As discussed in the present disclosure, syntax information from the base layer in SVC or base view in 3DV/MVC can be used for coding of the enhancement layer (for SVC) or for coding another view (for 3DV/MVC). For example, motion information such as motion vector and reference index from the base layer or base view can be used as a motion vector candidate in merge/AMVP modes. In another example, intra mode from the base layer or base view can be used as a most probable mode or intra mode predictor in the enhancement layer or another view coding (e.g., a dependent view).

For example, this base layer or base view information is derived from the co-located or corresponding block, so every block, however small, requires this derivation which may be unnecessarily complex. Additional complexity may be associated with using base layer/view syntax, since base layer/view information has to be accessed. Also, one or more motion vectors may require scaling before they can be used for coding the enhancement layer or dependent view.

The techniques described in this disclosure may address the additional complexity resulting from using base layer/view syntax information. For instance, the following are example techniques that may address the aforementioned problem (e.g., techniques of addressing the complexity related with using the base layer/view information for predicting a block in the enhancement layer or dependent view).

In one embodiment, base layer/view information may be derived once per block or group of blocks in the enhancement layer or enhancement view (e.g., dependent view). In some embodiments, block partitioning in the enhancement layer/view (e.g., enhancement layer or dependent view) can be signaled by partitioning mode (like 2N×2N, N×2N, 2N×N, N×N, or AMP in HEVC), or can be derived from the base layer/view partitions.

In one embodiment, base layer/view syntax derivation may be restricted for certain block sizes. It should be understood that the techniques of deriving motion information from the base layer/view once for a block or group of blocks in the enhancement layer/view and the techniques of restricting base layer/view syntax derivation for certain block sizes may be implemented separately or together. In other words, the above example techniques are not mutually exclusive, and it may be possible to implement either one of the above two example techniques separately or implement the techniques in combination.

Thus, as discussed above, information such as motion information or intra mode may be derived from the base layer and used for coding the current block (e.g., prediction unit) in the enhancement layer. In some embodiments, such derivation can be performed once per coding unit (CU) instead of for every prediction unit (PU). Alternatively, base layer/view syntax information can be derived once for every group of CUs or largest coding units (LCUs).

The size of base layer/view syntax derivation region can be signaled as a high level flag at least in one of the headers (SPS, PPS, slice for example). Also, whether the base layer/view information is to be derived once for every group of blocks can be also signaled with another high level flag in at least on the headers or be signaled at block level such as LCU/CU. For instance, information indicating the group of blocks that will share the base layer/view information may be signaled in the headers and/or at block level.

The base layer/view syntax used for a group of blocks in the enhancement layer or another view (e.g., dependent view sometimes referred to as enhancement view) can be derived from any sub-block of the co-located or corresponding region in the base layer/view. For example, co-located or corresponding region in the base layer/view can be center or corners of the region encompassed by the group of blocks in the enhancement layer/dependent view. Alternatively or additionally, the base layer/view syntax can be derived outside of the co-located or corresponding region.

For example, base layer motion information can be derived from the bottom right sub-block outside of the co-located CU or, alternatively or additionally, from the center sub-block of the co-located CU once per CU, and be used for every PU of the CU in the enhancement layer. A similar method can be applied for deriving base view motion information for the dependent view. A similar method can be applied for deriving intra mode or other syntax information.

For example, a greater reduction in the complexity can be achieved if more than one base layer syntax element is used for current enhancement layer coding, and similar reduction can be achieved for base view syntax element used for current dependent view coding. For example, in some other techniques (e.g., not those necessarily in accordance with the techniques described in this disclosure), multiple base layer/view motion information can be used as motion candidates in merge/AMVP mode for the PU in enhancement layer or dependent view, so more than one base layer/view motion vector has to be derived, and doing it for every PU can be burdensome. According to the techniques described in this disclosure, this multiple base layer/view motion vectors can be derived once per group of blocks in the enhancement layer/dependent view, for example, once for the CU rather than for every PU (e.g., for the CU rather than each PU within the CU).

As an additional or alternative embodiment to the base layer/view syntax derivation complexity reduction discussed above, base layer/view syntax information may be derived only for the blocks (PU or CU) of a certain size, for example, for a size greater than a threshold (e.g., predetermined or calculated when needed). In one embodiment, if the current PU is bigger than 8×4 or 4×8, then base layer/view motion information is derived for that block; otherwise no base layer/view information is used for the enhancement layer block/dependent view block for coding.

One or more ideas described herein (e.g., techniques based on deriving base layer/view syntax only for block of certain size) can be combined with the idea of base layer/view syntax derivation for a group of blocks. For example, for some blocks below the threshold, base layer/view syntax is derived for a group of blocks, and for block larger than the threshold normal, per-block or per-PU base layer/view syntax derivation can be applied. Alternatively, for blocks smaller than the threshold, no base layer/view information may be used for coding such blocks, and for blocks larger than the threshold, base layer/view information may be derived once per group of blocks (e.g., CU-based derivation).

Motion information and intra modes were used in the description above as an example. The techniques described in this disclosure are applicable to other syntax elements. Also, the techniques may be applicable for SVC and 3DV/MVC extension without restriction.

Figure 10:
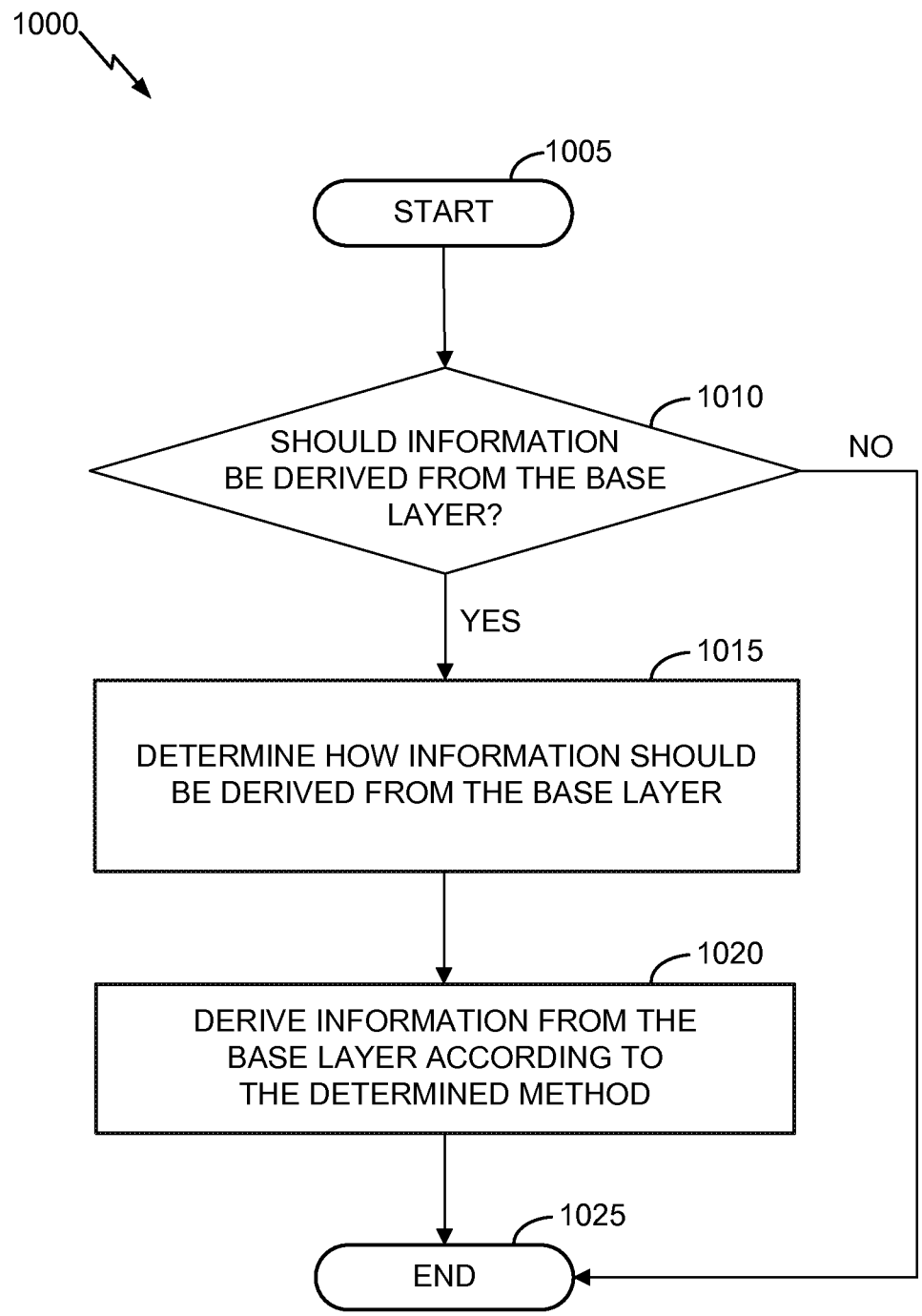
FIG. 10 is a flow chart illustrating a method of coding video information, according to one embodiment of the present disclosure.

FIG. 10 is a flowchart illustrating a method 1000 for coding video information. The method 1000 illustrated in FIG. 10 may be performed by an encoder (e.g., the video encoder 20 as shown in FIG. 2), a decoder (e.g., the video decoder 30 as shown in FIG. 3), or any other component. For convenience, the method 1000 is described as performed by a coder, which may be the encoder, the decoder or another component.

The method 1000 begins at block 1005. In block 1010, the coder determines whether information should be derived from the base layer. If the coder determines that information should not be derived from the base layer, the method 1000 ends at block 1025. If the coder determines that information should be derived from the base layer, in block 1015, the coder determines how information should be derived from the base layer. Although blocks 1010 and 1015 are shown separately, the determination of whether and how to derive information from the base layer may be combined into a single determination. The coder may make such determination (or series of determinations) based on whether the particular PU currently being coded has a size greater than a predetermined threshold (e.g., bigger than 8×4 or 4×8). For example, if the PU is determined to have a size greater than the threshold, information may be derived from the base layer for every such PU. On the other hand, if the PU has a size smaller than the threshold, information may not be derived from the base layer for the PU. In another example, if the PU has a size smaller than the threshold, the coder may derive information from the base layer for every group of blocks (e.g., for every CU that includes the particular PU); otherwise, the coder may derive the information from the base layer for every PU. In yet another example, if the PU has a size smaller than the threshold, the coder may not derive any information from the base layer for the particular PU; otherwise, the coder may derive information from the base layer for every group of blocks (e.g., once for every CU including the particular PU). In some embodiments, the coder may determine that information should be derived from the base layer for every sub-block, for every block, or for every group of blocks, or not at all, for each predicted sub-block/block regardless of the size thereof. Although information is being derived from a base layer in the example of FIG. 10, any other layer or view may be used for performing the method 1000. As shown in block 1020 of FIG. 10, once the coder determines how information (e.g., motion information or prediction information) should be derived from the base layer, information is derived from the base layer according to such determination. The method 1000 ends at block 1025.

Pruning Between BL MV and Spatial Candidates

In addition to the aforementioned methods, in some embodiments, pruning (e.g., removing redundant candidates) between BL MV candidates and spatial candidates may be applied. In other embodiments, pruning may be prevented from being applied between BL MV candidates and spatial candidates.

Other Embodiments

In some embodiments, BL MVs can be derived from any position inside or outside of the co-located block in the base layer. It may be the center block or any corners, bottom right block outside of the current co-located block and so on. In some embodiments, a BL MV (one or multiple) may be included as a first candidate in the list after TMVP, or at any position in the candidate list. In some embodiments, BL MV derivation can include the derivation of the motion vector or reference index from the corresponding co-located block in the base layer/view.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Various embodiments of the invention have been described. These and other embodiments are within the scope of the following claims.

What is claimed is:

1. An apparatus configured to code video information, the apparatus comprising:
   a memory configured to store a candidate list comprising at least one base layer motion vector candidate; and
   a processor in communication with the memory, the processor configured to:
      determine a first behavior for generating the at least one base layer motion vector candidate such that the first behavior is different from a second behavior for generating one or more spatial candidates to be added to the candidate list, wherein the first behavior specifies that the at least one base layer motion vector candidate is to be generated for every prediction unit (PU), and wherein the second behavior specifies that the one or more spatial candidates are to be generated once for all PUs in a coding unit (CU);
      generate the at least one base layer motion vector candidate for a current PU in the CU according to the first behavior based on a determination that a size of the current PU is greater than a predetermined threshold, the CU having one or more PUs;
      generate the one or more spatial candidates for the CU according to the second behavior;
      add the at least one base layer motion vector candidate generated according to the first behavior to the candidate list; and
      add the one or more spatial candidates generated according to the second behavior different from the first behavior to the candidate list.

2. The apparatus of claim 1, wherein the apparatus comprises an encoder, and wherein the processor is further configured to encode a video block using the stored candidate list.

3. The apparatus of claim 1, wherein the apparatus comprises a decoder, and wherein the processor is further configured to decode a video block using the stored candidate list.

4. The apparatus of claim 1, wherein the apparatus comprises a device selected from a group consisting of computers, notebooks, laptops, tablet computers, set-top boxes, telephone handsets, smart phones, smart pads, televisions, cameras, display devices, digital media players, video gaming consoles, and in-car computers.

5. The apparatus of claim 1, wherein the candidate list further includes a temporal motion vector predictor (TMVP).

6. The apparatus of claim 5, wherein the TMVP is generated according to the first behavior.

7. The apparatus of claim 5, wherein the TMVP is generated according to the second behavior.

8. The apparatus of claim 1, wherein the candidate list is a merge candidate list.

9. The apparatus of claim 1, wherein the candidate list is an advanced motion vector prediction (AMVP) candidate list.

10. The apparatus of claim 1, wherein the at least one base layer motion vector candidate is added as a first candidate in the candidate list.

11. The apparatus of claim 5, wherein the at least one base layer motion vector candidate is added after the TMVP.

12. The apparatus of claim 1, wherein the at least one base layer motion vector candidate is derived from a position inside of a co-located block in a base layer.

13. A method of encoding video information, the method comprising:
   determining a first behavior for generating the at least one base layer motion vector candidate to be added to a candidate list for encoding the video information such that the first behavior is different from a second behavior for generating one or more spatial candidates to be added to the candidate list, wherein the first behavior specifies that the at least one base layer motion vector candidate is to be generated for every prediction unit (PU), and wherein the second behavior specifies that the one or more spatial candidates are to be generated once for all PUs in a coding unit (CU);
   generating the at least one base layer motion vector candidate for a current PU in the CU according to the first behavior based on a determination that a size of the current PU is greater than a predetermined threshold, the CU having one or more PUs;
   generating the one or more spatial candidates for the CU according to the second behavior;

adding the at least one base layer motion vector candidate generated according to the first behavior to the candidate list; and adding the one or more spatial candidates generated according to the second behavior different from the first behavior to the candidate list.

14. The method of claim 13, further comprising adding a temporal motion vector predictor (TMVP) to the candidate list.

15. The method of claim 14, further comprising: generating the TMVP according to the first behavior.

16. The method of claim 14, further comprising: generating the TMVP according to the second behavior.

17. The method of claim 13, wherein the candidate list is a merge candidate list.

18. The method of claim 13, wherein the candidate list is an advanced motion vector prediction (AMVP) candidate list.

19. The method of claim 13, wherein the at least one base layer motion vector candidate is added as a first candidate in the candidate list.

20. The method of claim 14, wherein the at least one base layer motion vector candidate is added after the TMVP.

21. The method of claim 13, wherein the at least one base layer motion vector candidate is derived from a position inside of a co-located block in a base layer.

22. A method of decoding video information, the method comprising:

receiving syntax elements extracted from an encoded video bitstream;

determining a first behavior for generating the at least one base layer motion vector candidate to be added to a candidate list for decoding the video information such that the first behavior is different from a second behavior for generating one or more spatial candidates to be added to the candidate list, wherein the first behavior specifies that the at least one base layer motion vector candidate is to be generated for every prediction unit (PU), and wherein the second behavior specifies that the one or more spatial candidates are to be generated once for all PUs in a coding unit (CU);

generating the at least one base layer motion vector candidate for a current PU in the CU according to the first behavior based on a determination that a size of the current PU is greater than a predetermined threshold, the CU having one or more PUs;

generating the one or more spatial candidates for the CU according to the second behavior;

adding the at least one base layer motion vector candidate generated according to the first behavior to the candidate list; and adding the one or more spatial candidates generated according to the second behavior different from the first behavior to the candidate list.

23. The method of claim 22, further comprising adding a temporal motion vector predictor (TMVP) to the candidate list.

24. The method of claim 23, further comprising: generating the TMVP according to the first behavior.

25. The method of claim 23, further comprising: generating the TMVP according to the second behavior.

26. The method of claim 22, wherein the candidate list is a merge candidate list.

27. The method of claim 22, wherein the candidate list is an advanced motion vector prediction (AMVP) candidate list.

28. The method of claim 22, wherein the at least one base layer motion vector candidate is added as a first candidate in the candidate list.

29. The method of claim 23, wherein the at least one base layer motion vector candidate is added after the TMVP.

30. The method of claim 22, wherein the at least one base layer motion vector candidate is derived from a position inside of a co-located block in a base layer.

31. A non-transitory computer readable medium comprising code that, when executed, causes an apparatus to:

determine a first behavior for generating the at least one base layer motion vector candidate to be added to a candidate list such that the first behavior is different from a second behavior for generating one or more spatial candidates to be added to the candidate list, wherein the first behavior specifies that the at least one base layer motion vector candidate is to be generated for every prediction unit (PU), and wherein the second behavior specifies that the one or more spatial candidates are to be generated once for all PUs in a coding unit (CU);

generate the at least one base layer motion vector candidate for a current PU in the CU according to the first behavior based on a determination that a size of the current PU is greater than a predetermined threshold, the CU having one or more PUs;

generate the one or more spatial candidates for the CU according to the second behavior;

add the at least one base layer motion vector candidate generated according to the first behavior to the candidate list; and add the one or more spatial candidates generated according to the second behavior different from the first behavior to the candidate list.

32. The medium of claim 31, the process further comprising adding a temporal motion vector predictor (TMVP) to the candidate list.

33. The medium of claim 32, the process further comprising:

generating the TMVP according to the first behavior.

34. A video coding device configured to code video information, the video coding device comprising:

means for determining a first behavior for generating the at least one base layer motion vector candidate to be added to a candidate list for coding the video information such that the first behavior is different from a second behavior for generating one or more spatial candidates to be added to the candidate list, wherein the first behavior specifies that the at least one base layer motion vector candidate is to be generated for every prediction unit (PU), and wherein the second behavior specifies that the one or more spatial candidates are to be generated once for all PUs in a coding unit (CU);

means for generating the at least one base layer motion vector candidate for a current PU in the CU according to the first behavior based on a determination that a size of the current PU is greater than a predetermined threshold, the CU having one or more PUs;

means for generating the one or more spatial candidates for the CU according to the second behavior;

means for adding the at least one base layer motion vector candidate generated according to the first behavior to the candidate list; and means for adding the one or more spatial candidates generated according to the second behavior different from the first behavior to the candidate list.

35. The device of claim 34, further comprising means for adding a temporal motion vector predictor (TMVP) to the candidate list.

36. The device of claim 35, further comprising:
means for generating the TMVP according to the first behavior.

* * * * *